(12) United States Patent
Gowda et al.

(10) Patent No.: US 12,346,747 B2
(45) Date of Patent: Jul. 1, 2025

(54) LCS SDXI RESOURCE OWNERSHIP SYSTEM

(71) Applicant: Dell Products L.P., Round Rock, TX (US)

(72) Inventors: Srinivas Giri Raju Gowda, Fremont, CA (US); Shyamkumar T. Iyer, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 17/875,786

(22) Filed: Jul. 28, 2022

(65) Prior Publication Data
US 2024/0036935 A1    Feb. 1, 2024

(51) Int. Cl.
*G06F 9/46* (2006.01)
*G06F 9/50* (2006.01)

(52) U.S. Cl.
CPC .......... *G06F 9/5077* (2013.01); *G06F 9/5016* (2013.01)

(58) Field of Classification Search
CPC .............................. G06F 9/5077; G06F 9/5016
See application file for complete search history.

(56) References Cited

U.S. PATENT DOCUMENTS 8,429,630 B2    4/2013    Nickolov et al.

*Primary Examiner* — Gregory A Kessler
(74) *Attorney, Agent, or Firm* — Joseph Mencher

(57) ABSTRACT

An LCS SDXI resource ownership system includes a resource system having an orchestrator device coupled to resource devices and a resource management system. An SDXI controller subsystem is provided by the resource management system and/or the orchestrator device, and operates to use the first resource system to provide an LCS with an SDXI data plane provided by an SDXI node included in the resource devices, and create an SDXI configuration space for the LCS. The SDXI controller subsystem then receives a unique LCS identifier from the LCS via the SDXI configuration space, and links the SDXI node to the LCS in an SDXI resource database using the unique LCS identifier. The SDXI controller subsystem then migrates the LCS to a second resource system, and the LCS performs operations using the SDXI node following migration to the second resource system based on the linking of the LCS to the SDXI node.

20 Claims, 29 Drawing Sheets

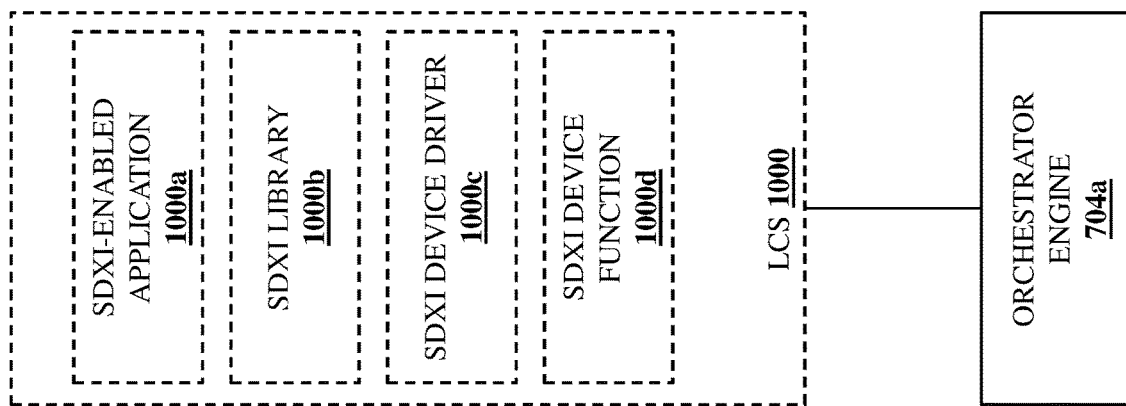

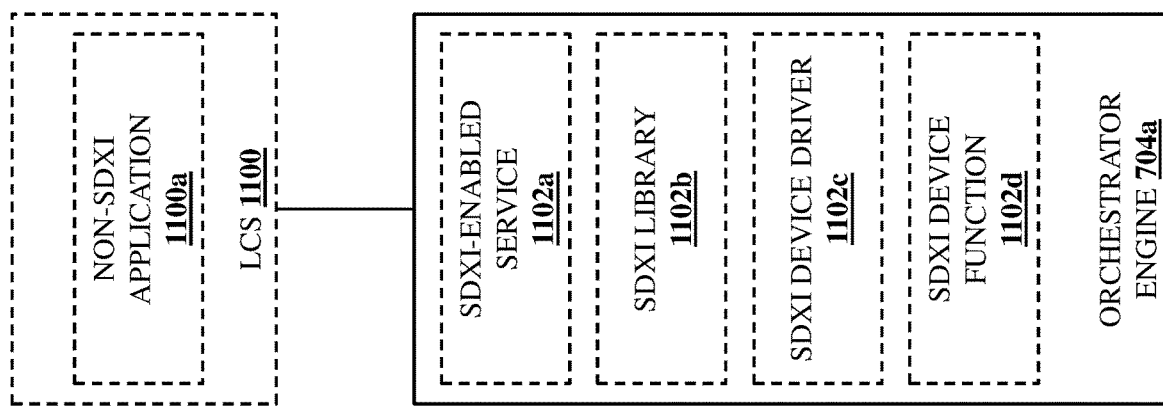

LCS SDXI RESOURCE OWNERSHIP SYSTEM

BACKGROUND

The present disclosure relates generally to information handling systems, and more particularly to providing ownership of Smart Data Accelerator Interface (SDXI) resources for an LCS that is provided using an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, LCSs are often provided using Bare Metal Server (BMS) systems or other resource systems known in the art, with resource devices included within and/or outside of those resource systems (e.g., processing devices and memory devices on a motherboard in the BMS system used to provide an Operating System (OS) for the LCS, storage devices, networking devices, etc.) used to perform the functionality for the LCSs, and often dynamically changing over the time period in which the LCS is provided. Furthermore, orchestrator devices in the BMS systems may orchestrate the provisioning of those LCSs while also including resource devices that may be utilized to provide the functionality of those LCSs. To provide a specific example, an orchestrator device may utilize memory systems provided by any of the resource devices discussed above to provide for the storage and use of data by the LCS.

The Storage Networking Industry Association (SNIA) is developing the Smart Data Accelerator Interface (SDXI) in an effort to standardize a data plane for memory-to-memory data transfers/transforms (e.g., a data plane that enables work submission and work completion involving memory-to-memory data transfers/transforms). For example, the SDXI may be utilized to transfer data between memory addresses in memory address space in the same memory system (e.g., between two virtual machines, or two applications in the same virtual machine, that share the memory address space in the same memory system). However, that standardization has not considered a control plane that would provide for the configuration of the memory address space that includes the memory addresses between which data will be transferred/transformed. As will be appreciated by one of skill in the art, the SDXI-based memory-to-memory data transfers/transforms discussed above are relatively simple in a static memory system including the memory address space having the memory addresses between which data will be moved and/or transformed. However, no SDXI control plane standardization exists that addresses how to configure memory system(s) included in a composed LCS to provide a memory address space so that the SDXI-based memory-to-memory data transfers/transforms discussed above may be performed between memory addresses in that memory address space.

Accordingly, it would be desirable to provide an LCS SDXI data plane configuration system that addresses the issues discussed above.

SUMMARY

According to one embodiment, an Information Handling System (IHS) includes at least one processing system; and at least one memory system that is coupled to the at least one processing system and that includes instructions that, when executed by the at least one processing system, cause the at least one processing system to provide a Smart Data Accelerator Interface (SDXI) controller engine that is configured to: provide, using a first resource system, a first Logically Composed System (LCS) with an SDXI data plane that is provided by a first SDXI node included in a plurality of resource devices; create an SDXI configuration space for the first LCS; receive, from the first LCS via the SDXI configuration space, a unique LCS identifier; link, in an SDXI resource database using the unique LCS identifier, the first SDXI node to the first LCS; and migrate the first LCS to a second resource system, wherein the linking of the first LCS to the first SDXI node in the SDXI resource database allows the first LCS to perform operations using the first SDXI node following migration to the second resource system.

BRIEF DESCRIPTION OF THE DRAWINGS

FIG. 10 is a schematic view illustrating an embodiment of an LCS that may be provided during the method of FIG. 8.

FIG. 11 is a schematic view illustrating an embodiment of an LCS that may be provided during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
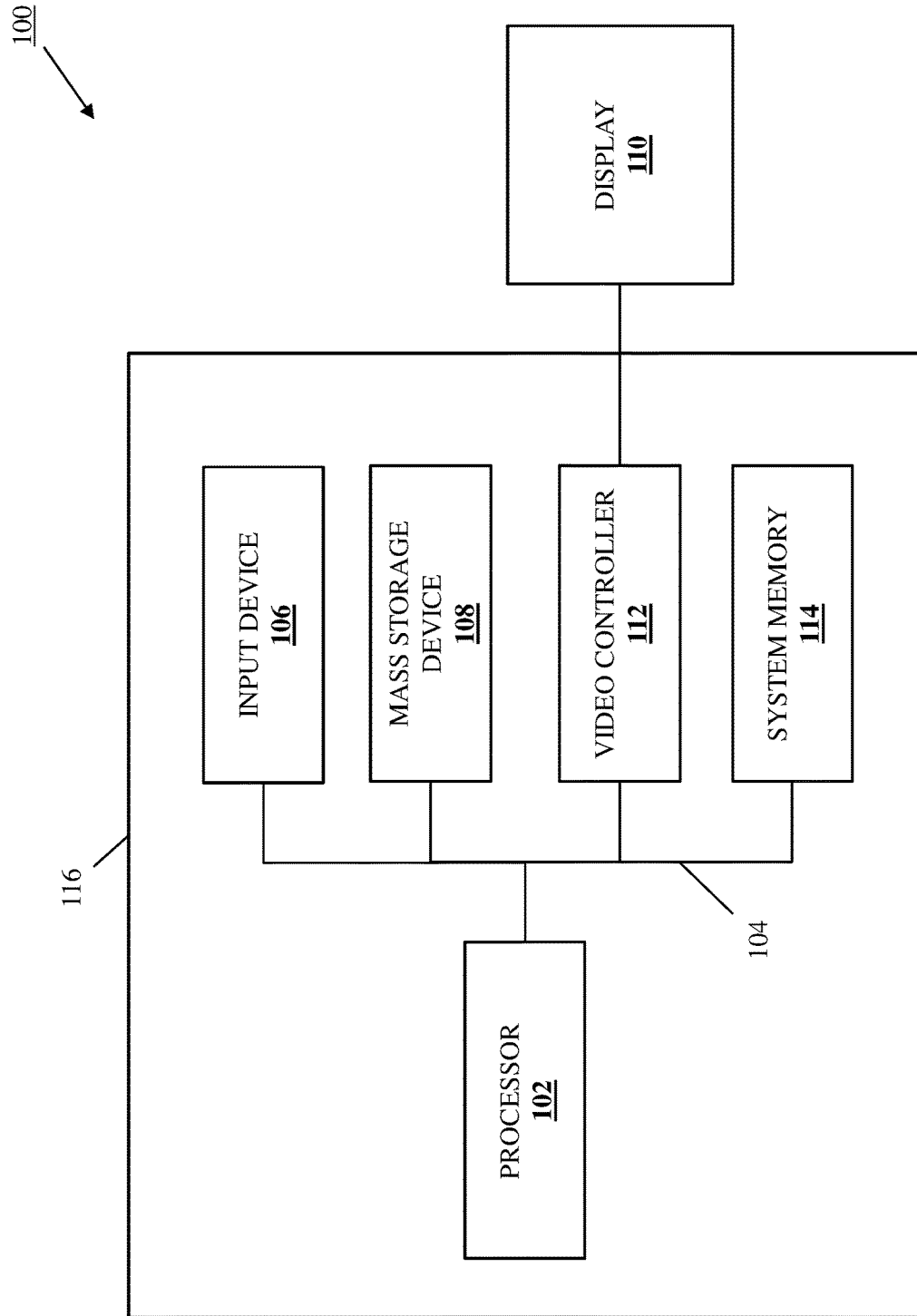
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) Smart Data Accelerator Interface (SDXI) data plane configuration systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
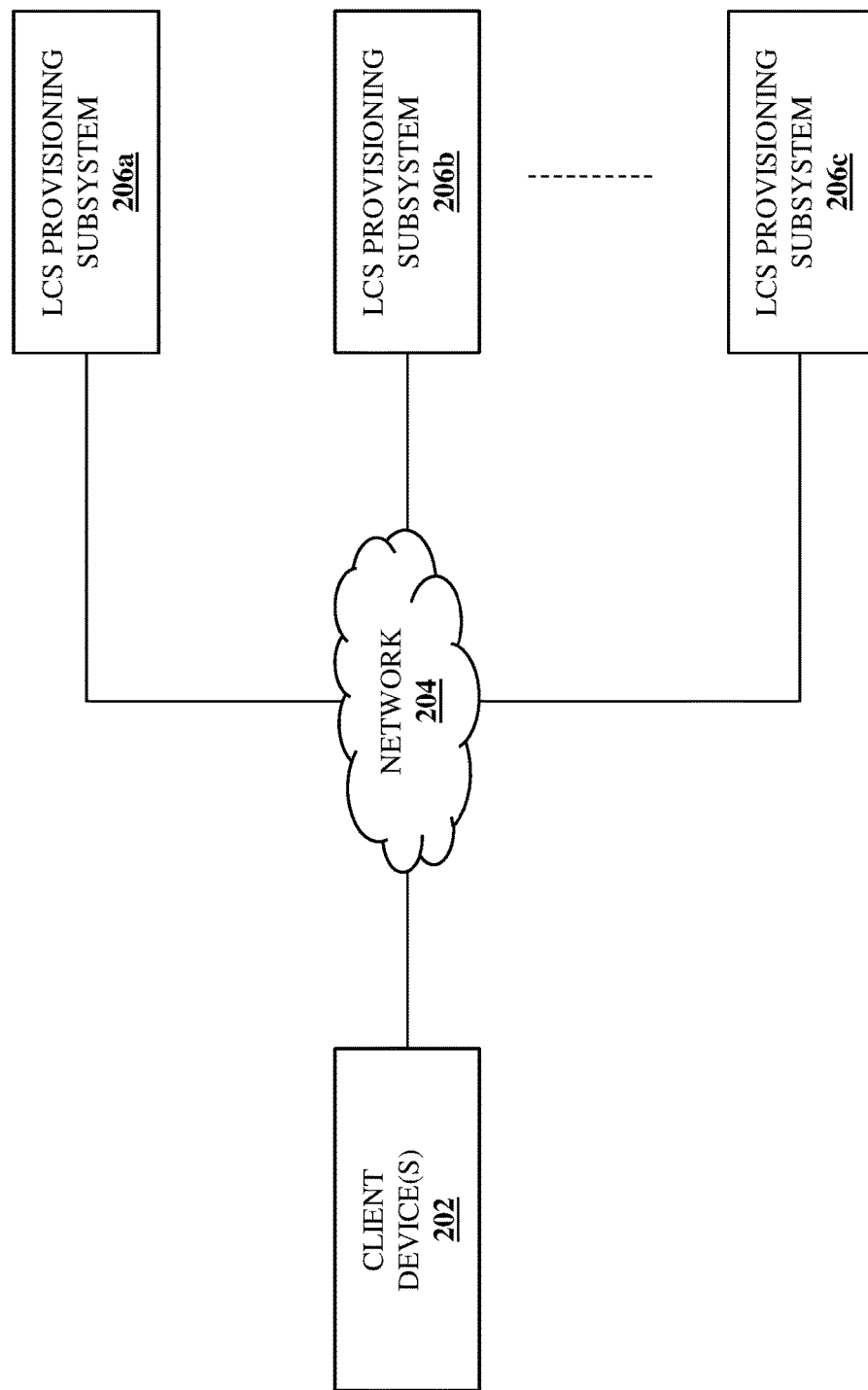
FIG. 2 is a schematic view illustrating an embodiment of an LCS provisioning system.

With reference to FIG. 2, an embodiment of a LCS provisioning system 200 is illustrated that may be utilized with the LCS SDXI data plane configuration systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
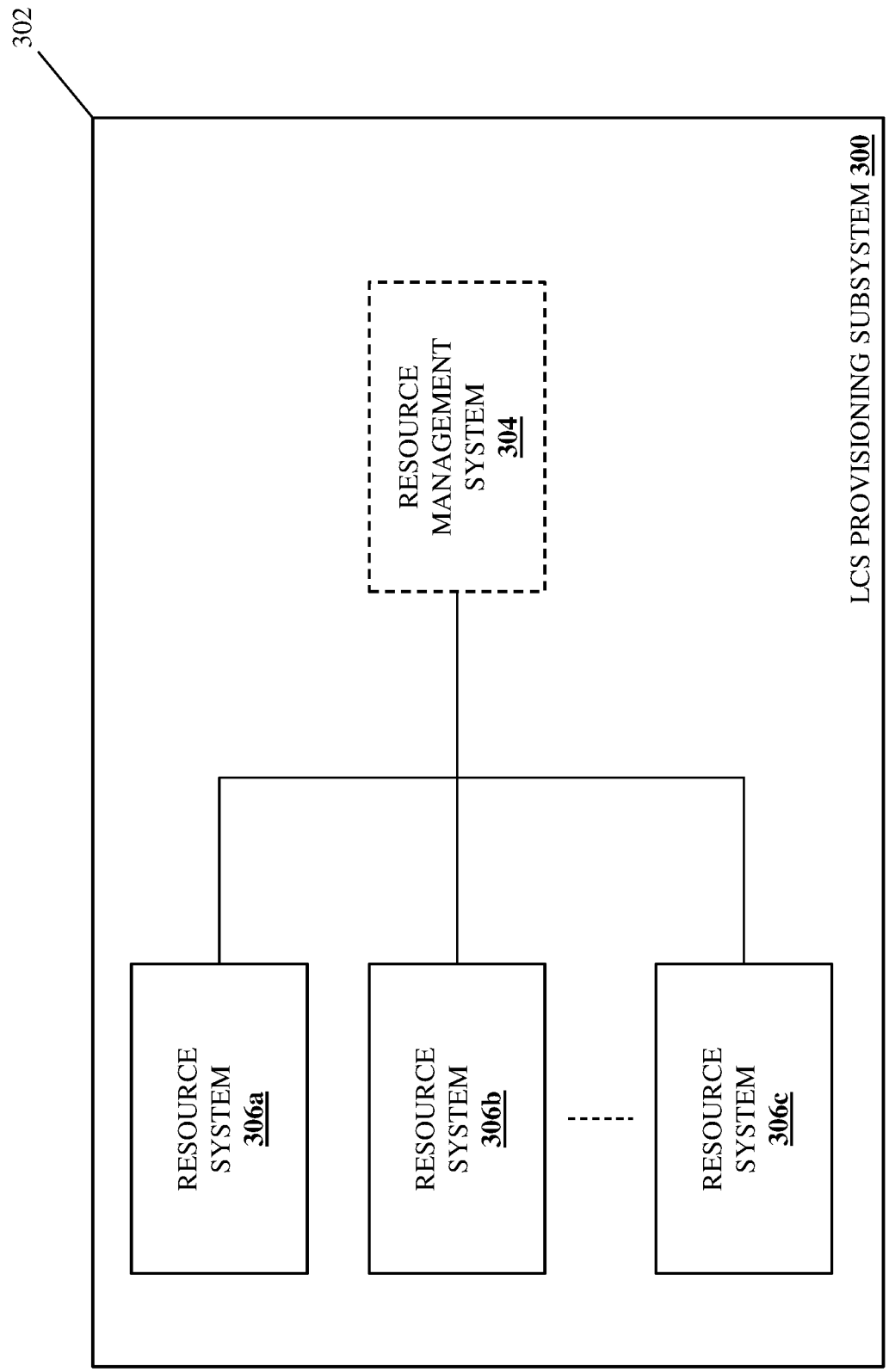
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein. However, while described as being provided by an SCP device or DPU device, one of skill in the art in possession of the present disclosure will appreciate how the orchestrator device of the present disclosure may also be provided by other devices that have been configured to perform the orchestrator functionality described below while remaining within the scope of the present disclosure as well.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
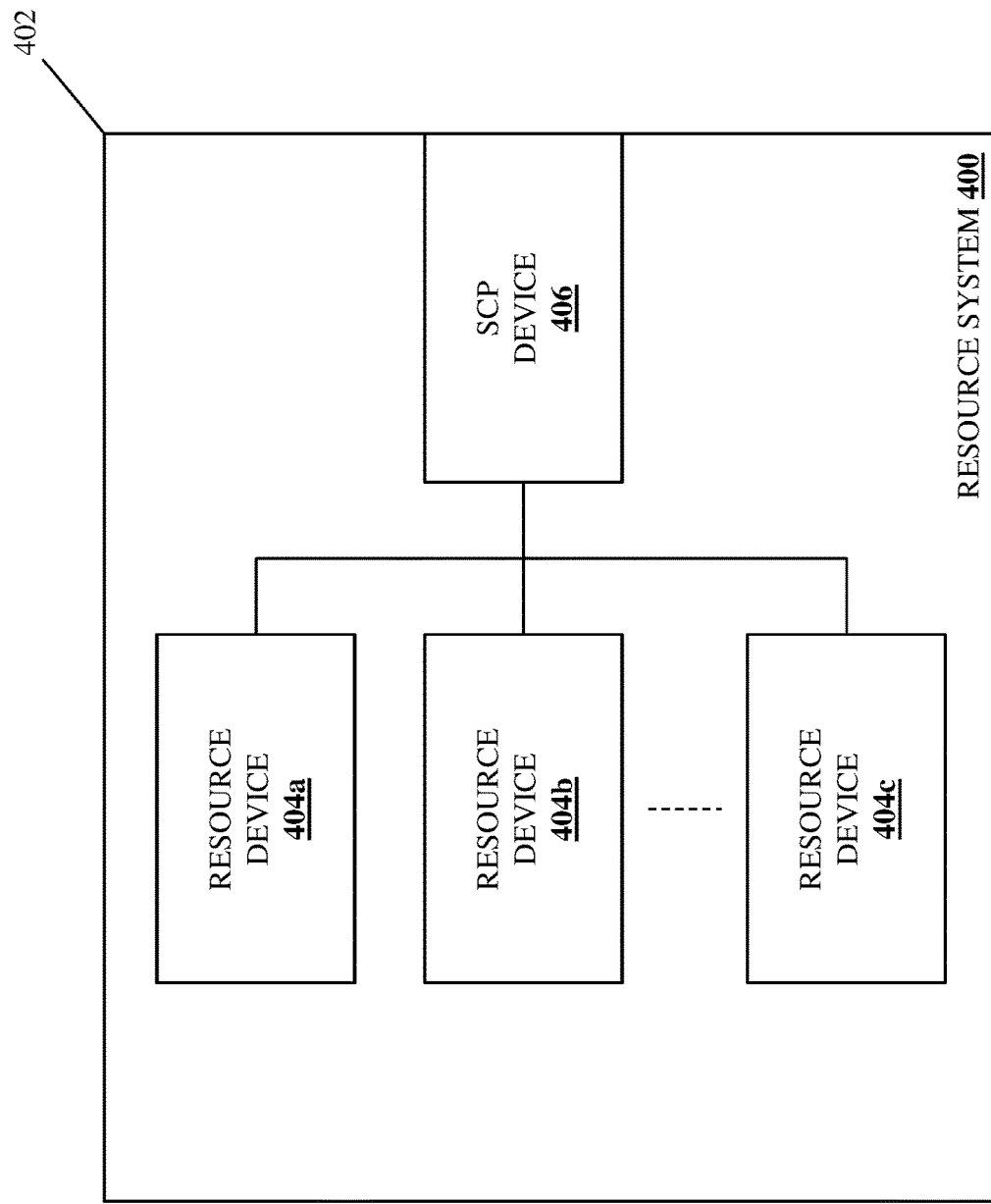
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
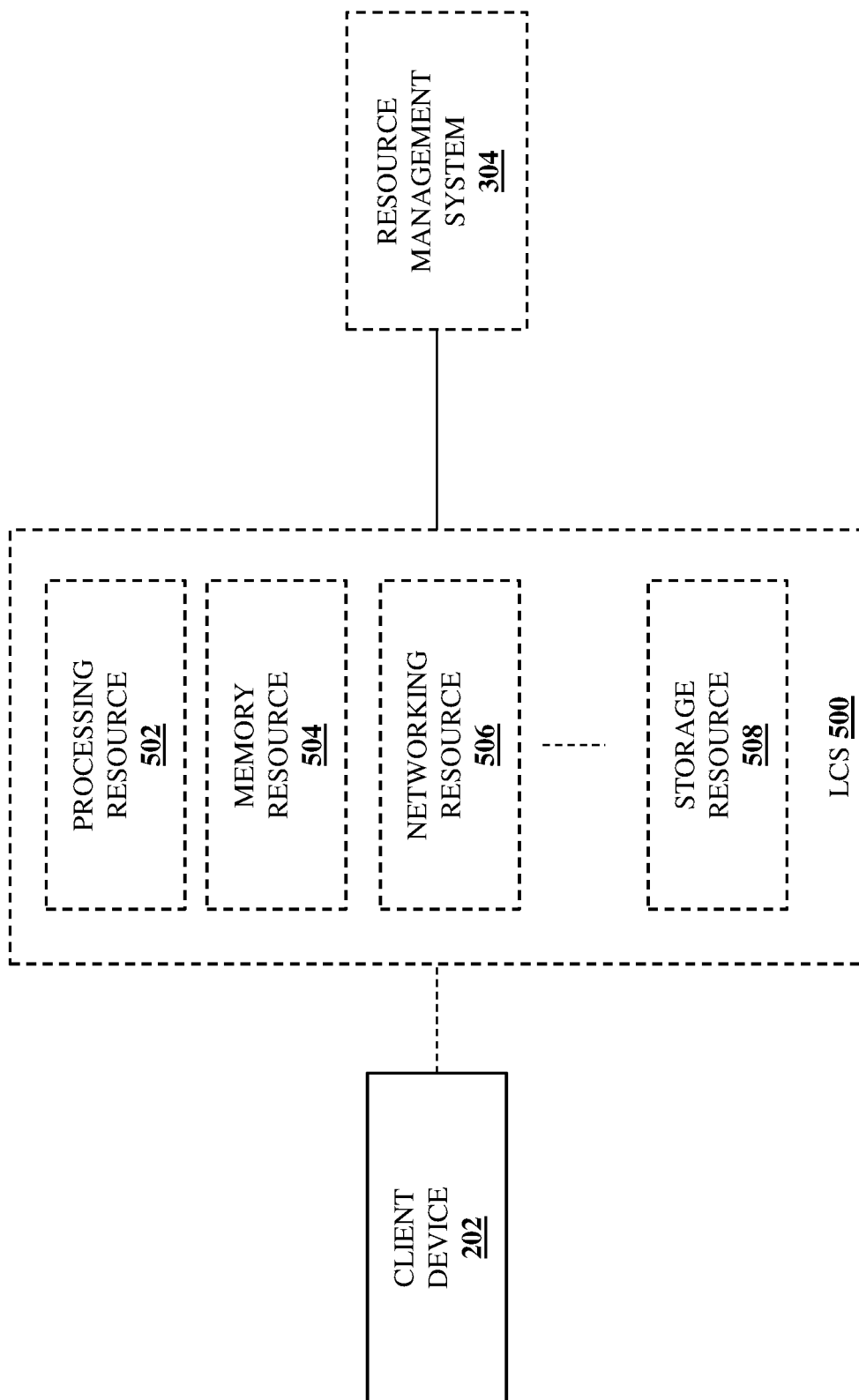
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
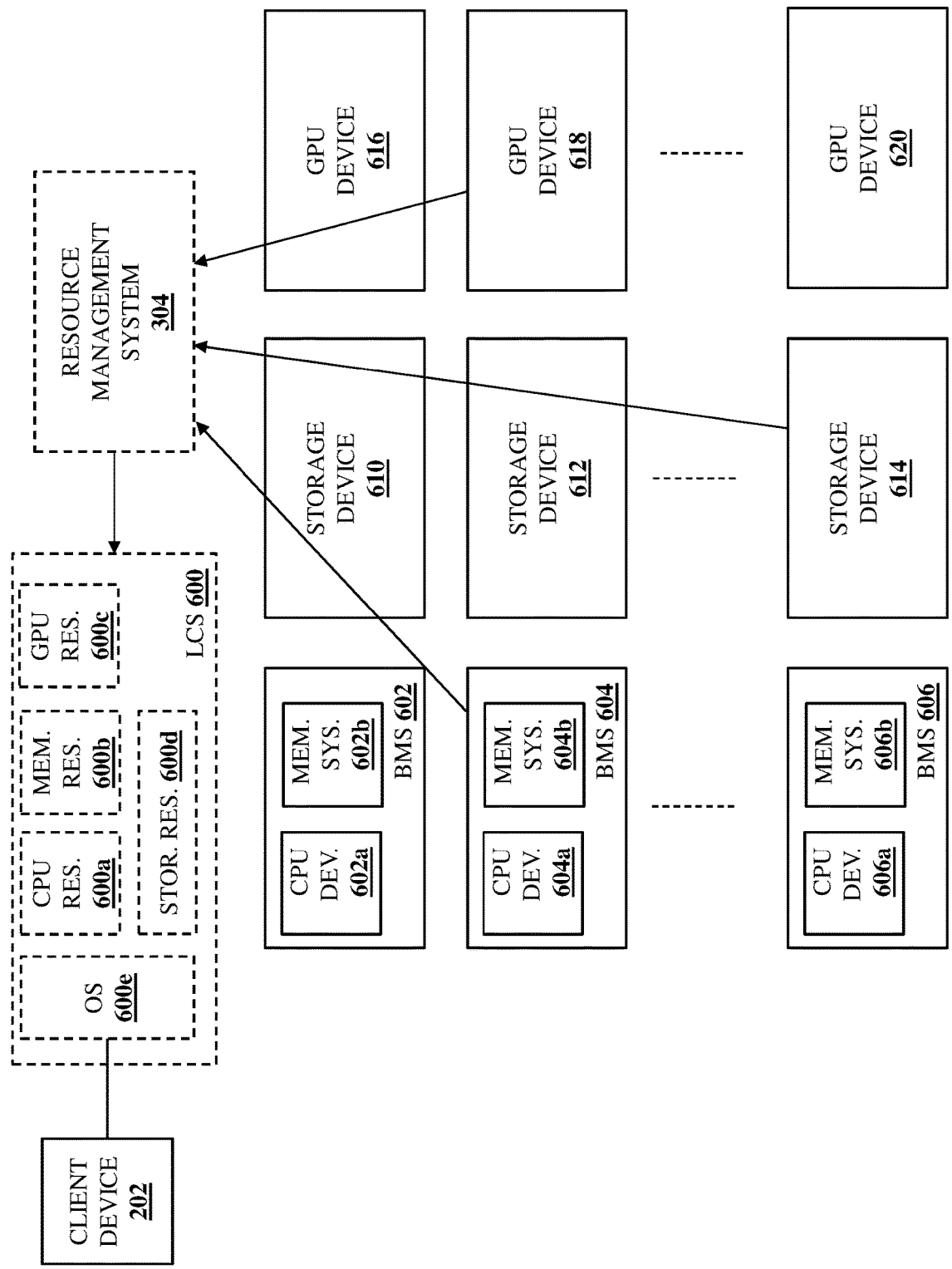
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
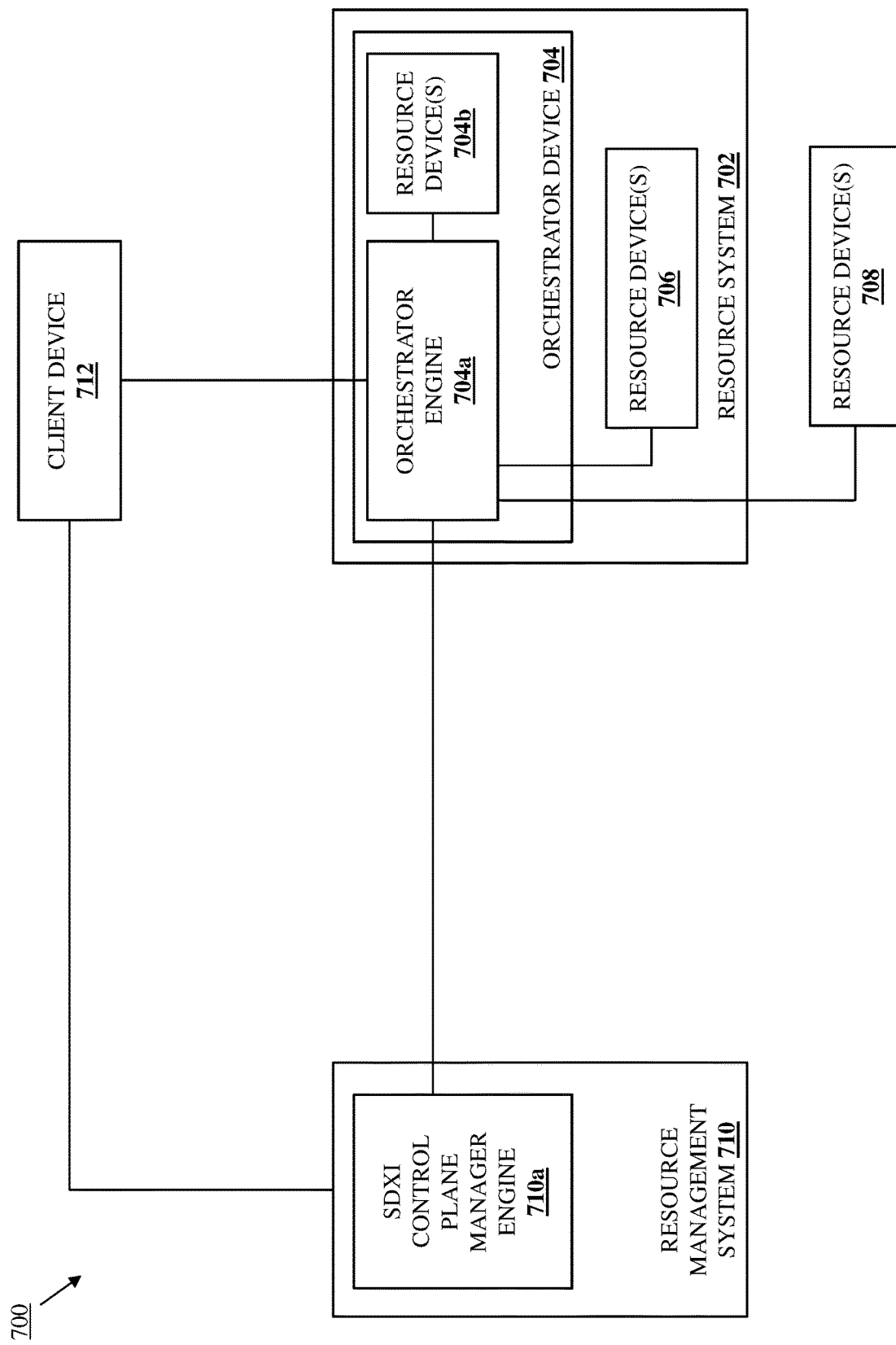
FIG. 7 is a schematic view illustrating an embodiment of an LCS SDXI data plane configuration system provided according to the teachings of the present disclosure.

Referring now to FIG. 7, an embodiment of an LCS SDXI data plane configuration system 700 is illustrated that may be provided according to the teachings of the present disclosure. In the illustrated embodiment, the LCS SDXI data plane configuration system 700 includes a resource system 702 that may be provided by any of the resource systems 306*a*, 306*b*, 306*c*, and 400, and/or the BMS systems 602, 604, and 606 discussed above. The resource system 702 includes an orchestrator device 704 that may be provided by the SCP devices, DPU devices, and/or other orchestrator devices discussed above. The orchestrator device 704 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an orchestrator engine 304 (e.g., the SCP engine, DPU engine, or other orchestrator engines discussed above) that is configured to perform the functionality of the orchestrator engines and/or orchestrator devices discussed below. In some of the specific examples provided below, the orchestrator engine 704*a* may include a microvisor, hypervisor, and/or other sub-engine that is configured to assist in the provisioning the SDXI data plane discussed below, as well as provide any other microvisor/hypervisor functionality that would be apparent to one of skill in the art in possession of the present disclosure.

In the illustrated embodiment, the orchestrator device 704 also includes one or more resource device(s) 704*b* (e.g., resource device(s) 704*b* that are included on or directly connected to a circuit board that provides the orchestrator device 704), with the resource device(s) 704*b* coupled to the orchestrator engine 704*a* (e.g., via a coupling between the resource device(s) 704*b* and the processing system). In the specific examples discussed below, the resource device(s) 704*b* may include at least one SDXI node, which as discussed below may be provided by a "node" that is both configured to receive and process SDXI information (e.g., SDXI descriptors, SDXI functions, and/or other SDXI information defined by the SDXI specification), and includes a memory subsystem (e.g., one or more memory devices and/or portion(s) thereof, one or more storage devices and/or portion(s) thereof, one or more Graphics Processing Unit (GPU) systems and/or portion(s) thereof, etc.) that is configured or otherwise capable of providing an SDXI memory space.

In the illustrated embodiment, the resource management system 702 also includes one or more resource device(s) 706 (e.g., resource device(s) 706 that are included in the chassis of a BMS system that may provide the resource system 702 as discussed above and that are not included on or connected to a circuit board that provides the orchestrator device 704), with the resource device(s) 706 coupled to the orchestrator engine 704*a* (e.g., via a cabled coupling between the resource device(s) 706 and the processing system). In the specific examples discussed below, the resource device(s) 706 may include at least one SDXI node, which as discussed below may be provided by a "node" that is both configured to receive and process SDXI information (e.g., SDXI descriptors, SDXI functions, and/or other SDXI information defined by the SDXI specification), and includes a memory subsystem (e.g., one or more memory devices and/or portion(s) thereof, one or more storage devices and/or portion(s) thereof, one or more Graphics Processing Unit (GPU) systems and/or portion(s) thereof, etc.) that is configured or otherwise capable of providing an SDXI memory space.

In the illustrated embodiment, the LCS SDXI data plane configuration system 700 also includes one or more resource device(s) 708 (e.g., resource device(s) 708 that are located outside of the chassis of a BMS system that may provide the resource system 702 as discussed above), with the resource device(s) 708 coupled to the orchestrator engine 704*a* (e.g., via a network coupling between the resource device(s) 708 and the processing system). In the specific examples discussed below, the resource device(s) 708 may include at least one SDXI node, which as discussed below may be provided by a "node" that is both configured to receive and process SDXI information (e.g., SDXI descriptors, SDXI functions, and/or other SDXI information defined by the SDXI specification n), and includes a memory subsystem (e.g., one or more memory devices and/or portion(s) thereof, one or more storage devices and/or portion(s) thereof, one or more Graphics Processing Unit (GPU) systems and/or portion(s) thereof, etc.) that is configured or otherwise capable of providing an SDXI memory space.

In the illustrated embodiment, the LCS SDXI data plane configuration system 700 also includes a resource management system 710 that may be provided by the resource management system 304 discussed above, and thus may include the SCPM device, the DPUM device, and/or other resource management systems discussed above. As illustrated, the resource management system 710 may include a processing system (not illustrated, but which may include the processor 102 discussed above with reference to FIG. 1)

and a memory system (not illustrated, but which may include the memory 114 discussed above with reference to FIG. 1) that is coupled to the processing system and that includes instructions that, when executed by the processing system, cause the processing system to provide an SDXI control plane manager engine 710a that is configured to perform the functionality of the SDXI control plane manager engines and/or resource management systems discussed below. In the illustrated embodiment, the SDXI control plane manager engine 710a is coupled to the orchestrator engine 704a (e.g., via a coupling between the respective processing systems that provide the SDXI control plane manager engine 710a and the orchestrator engine 704a).

In the illustrated embodiment, the LCS SDXI data plane configuration system 700 also includes a client device 712 that may be provided by any of the client device(s) 202 discussed above, and thus may be provided by desktop computing devices, laptop/notebook computing devices, tablet computing devices, mobile phones, and/or other computing devices that would be apparent to one of skill in the art in possession of the present disclosure. As discussed above, the client device 712 may be coupled to each of the resource management system 710 and the orchestrator device 704 in the resource system 702 (e.g., via a network). However, while a specific LCS SDXI data plane configuration system 700 has been illustrated and described, one of skill in the art in possession of the present disclosure will recognize that the LCS SDXI data plane configuration system of the present disclosure may include a variety of components and/or component configurations for providing conventional LCS provisioning functionality, as well as the functionality discussed below, while remaining within the scope of the present disclosure as well.

Figure 8:
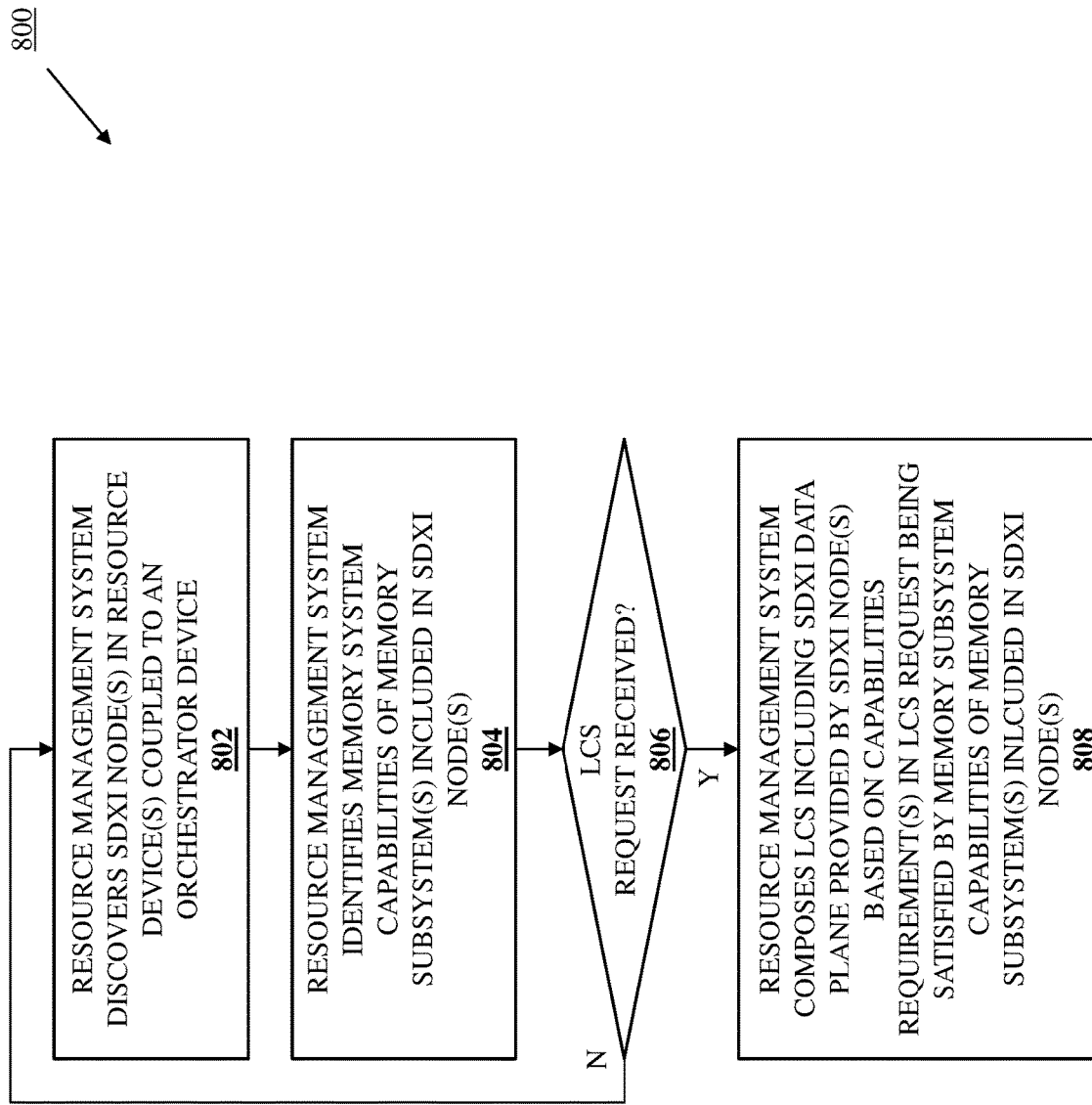
FIG. 8 is a flow chart illustrating an embodiment of a method for configuring an SDXI data plane for an LCS.

Referring now to FIG. 8, an embodiment of a method 800 configuring a Smart Data Accelerator Interface (SDXI) data plane for a Logically Composed System (LCS) is illustrated. As discussed below, the systems and methods of the present disclosure provide for the configuration of an SDXI data plane for an LCS using SDXI node(s) that are included in the resource device(s) that provide that LCS. For example, the LCS SDXI data plane configuration system of the present disclosure may include a resource management system coupled to an orchestrator device that is coupled to a plurality of resource devices. The resource management system discovers a first SDXI node in the plurality of resource devices, with the first SDXI node configured to process SDXI information and including a first memory subsystem that is configured to provide an SDXI memory space. The resource management system also identifies first memory system capabilit(ies) of the first memory subsystem included in the first SDXI node and, when the resource management system subsequently receives an LCS request, it composes an LCS that includes an SDXI data plane provided by the first SDXI node based on capabilities requirement(s) identified in the LCS request being satisfied by the first memory subsystem capabilit(ies) of the first memory subsystem included in the first SDXI node. As such, an LCS may be provided an SDXI data plane made up of one or more memory subsystem, and in many cases may be provided an SDXI data plane made up of different memory systems and/or different types of memory devices.

As discussed below, embodiments of the systems and methods of the present disclosure may include an SDXI control plane manager that is configured to manage an SDXI control plane and make memory address spaces provided by memory subsystems available to an LCS (e.g., to an application memory space for the LCS) using non-SDXI means (e.g., microvisors, hypervisors, and/or other configuration subsystems that may be included in the orchestrator device that provides the LCS as discussed above). As discussed below, the SDXI control plane manager may also provide for the opaque scaling (e.g., from the perspective of the client device/LCS) of memory resources as memory resource demands of the LCS (e.g., application(s) on the LCS) increase. As such, SDXI techniques may be leveraged by the SDXI control plane manager to abstract LCS/application memory resource access using, for example, heterogeneous accelerators, different classes/tiers of memory subsystems, and/or other memory components that would be apparent to one of skill in the art in possession of the present disclosure.

As discussed below, the SDXI control plane manager of the present disclosure may operate to utilize any discovered SDXI-enabled resources to provide in an SDXI data plane for an LCS, and then apply various levels of abstraction of that SDXI data plane based on the SDXI access capabilities of that LCS. As such, the SDXI control plane manager may determine the configuration of the SDXI data plane for an LCS and how that SDXI data plane is presented to that LCS, as well as how that LCS may operate to access that SDXI data plane. As discussed below, the SDXI data plane may then be provided for the LCS via an application address space, a virtual machine address space, a Java virtual machine address space, an address space provided via two or more SDXI nodes, and/or in a variety of other manners that would be apparent to one of skill in the art in possession of the present disclosure. Furthermore, the SDXI data plane may then be assigned directly to an LCS, or may be assigned to the resource system (e.g., a BMS system) that hosts the LCS (i.e., that includes the processing system/memory system that provide the operating system for that LCS) in order to allow that LCS to access the SDXI data plane via an SDXI service that is configured to enable access to the SDXI data plane.

Figure 9A:
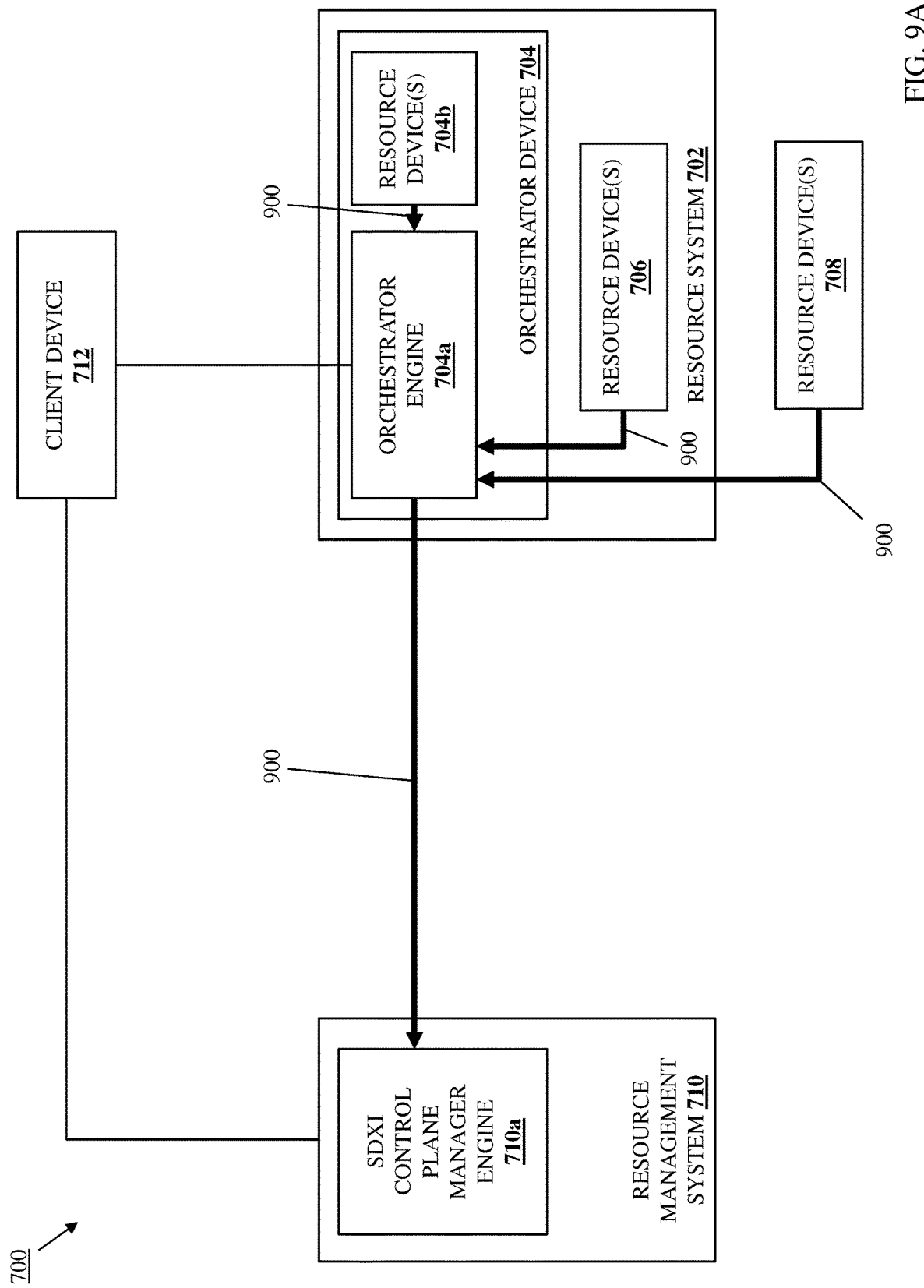
FIG. 9A is a schematic view illustrating an embodiment of the LCS SDXI data plane configuration system of FIG. 7 operating during the method of FIG. 8.

The method 800 begins at block 802 where a resource management system discovers one or more SDXI node(s) in resource device(s) that are coupled to an orchestrator device. In an embodiment, at block 802, the SDXI control plane manager engine 710a in the resource management system 710 may perform SDXI node discovery operations in order to discover SDXI node(s) provided by any of the resource device(s) 704b included on the orchestrator device 704, any of the resource device(s) 706 included in the resource system 702 but not included on the orchestrator device 704, and/or any of the resource device(s) 708 located outside of the resource system 702. For example, as illustrated in FIG. 9A, the resource device(s) 704b, 706, and 708 and/or the orchestrator device 704a that provide SDXI nodes may perform SDXI node registration operations 900 that include transmitting SDXI node identification messages to the SDXI control plane manager engine 710a in the resource management system 710 that cause the SDXI control plane manager engine 710a to identify the SDXI nodes included in the resource device(s) 704b, 706, and 708 at block 802.

For example, any of the resource device(s) 704b, 706, and 708 may provide an SDXI node that includes a memory subsystem (e.g., included in or with one or more memory devices, storage devices, Graphics Processing Units (GPUs), etc.) that is configured or otherwise capable of providing an SDXI memory space, with that SDXI node also including a processing system and memory system that includes instruction that, when executed by the processing system, cause the processing system to provide an SDXI node engine that is configured to receive and process SDXI information such as SDXI descriptors, SDXI functions, and/or other SDXI information defined by the SDXI specification. Furthermore, the SDXI node engine in any of the resource device(s) 704b, 706, and 708 may also be configured to register its SDXI node (which is provided by the SDXI node engine and the SDXI memory-space-capable memory subsystem in a resource device as discussed above) with the SDXI control plane manager engine 710a with via the orchestrator device 704a as illustrated in FIG. 9A, or directly in embodiments in which that resource device includes a direct coupling with the resource management system 710. As such, at block 802 the SDXI control plane manager engine 710a in the resource management system 710 may discover SDXI nodes provided by any of the resource devices 704a, 706, and/or 708.

In another example, any of the resource device(s) 704b, 706, and 708 may include a memory subsystem (e.g., included in or with one or more memory devices, storage devices, Graphics Processing Units (GPUs), etc.) that is configured or otherwise capable of providing an SDXI memory space, while the orchestrator engine 704a may be configured to perform the SDXI node engine operations discussed above for that resource device that include receiving and processing SDXI information such as SDXI descriptors, SDXI functions, and/or other SDXI information defined by the SDXI specification. Furthermore, the orchestrator engine 704a may also be configured to perform the SDXI node engine operations discussed above for that resource device that include registering its SDXI node (which is provided by the orchestrator engine 704a and the SDXI memory-space-capable memory subsystem in a resource device as discussed above) with the SDXI control plane manager engine 710a as illustrated in FIG. 9A. Further still, while not illustrated or discussed in detail herein, one of skill in the art in possession of the present disclosure will recognize how the SDXI nodes of the present disclosure may be configured to de-register with the SDXI control plane manager engine 710a in a manner similar to the registration discussed above.

As such, at block 802 the SDXI control plane manager engine 710a in the resource management system 710 may discover SDXI nodes provided by a combination of the orchestrator engine 704a in the orchestrator device 704 and any of the resource devices 704a, 706, and/or 708. Furthermore, while not illustrated or described in detail, one of skill in the art in possession of the present disclosure will appreciate how an orchestrator device in a resource system that includes any of the resource device(s) 708 may operate to perform the SDXI node engine operations discussed above that include receiving and processing the SDXI information and registering an SDXI node that includes the SDXI memory-space-capable memory subsystem in any of the resource device(s) 708 while remaining within the scope of the present disclosure as well.

However, while a few specific examples of the registration/discovery of SDXI nodes with/by the SDXI control plane manager engine 710a/resource management system 710 have been described, one of skill in the art in possession of the present disclosure will appreciate how SDXI nodes in the LCS SDXI data plane configuration system of the present disclosure may be discovered in other manners that will fall within the scope of the present disclosure as well. As such, following block 802, the SDXI control plane manager engine 710a in the resource management system 710 may have discovered any SDXI nodes that include or are provided by the resource device(s) 704b, 706, and/or 708 coupled to the orchestrator device 704, and may store the identity of those SDXI nodes in a database that is accessible to the SDXI control plane manager engine 710a and in association with the orchestrator device 704 in order to, for example, allow any LCSs that are subsequently composed for provisioning by the orchestrator device 704 to be provided an SDXI data plane using any of those SDXI nodes, as discussed in further detail below.

Figure 9B:
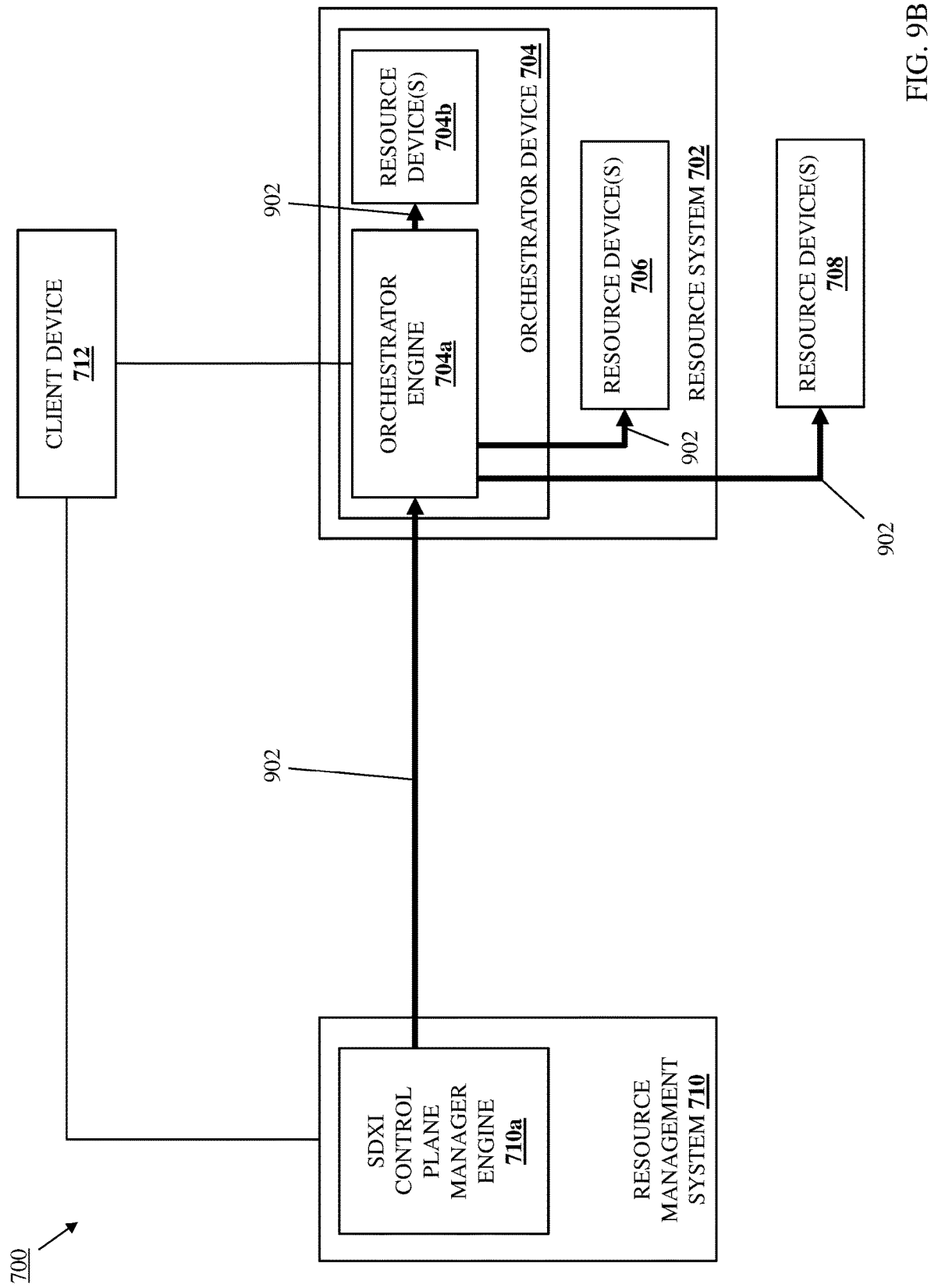
FIG. 9B is a schematic view illustrating an embodiment of the LCS SDXI data plane configuration system of FIG. 7 operating during the method of FIG. 8.
Figure 9C:
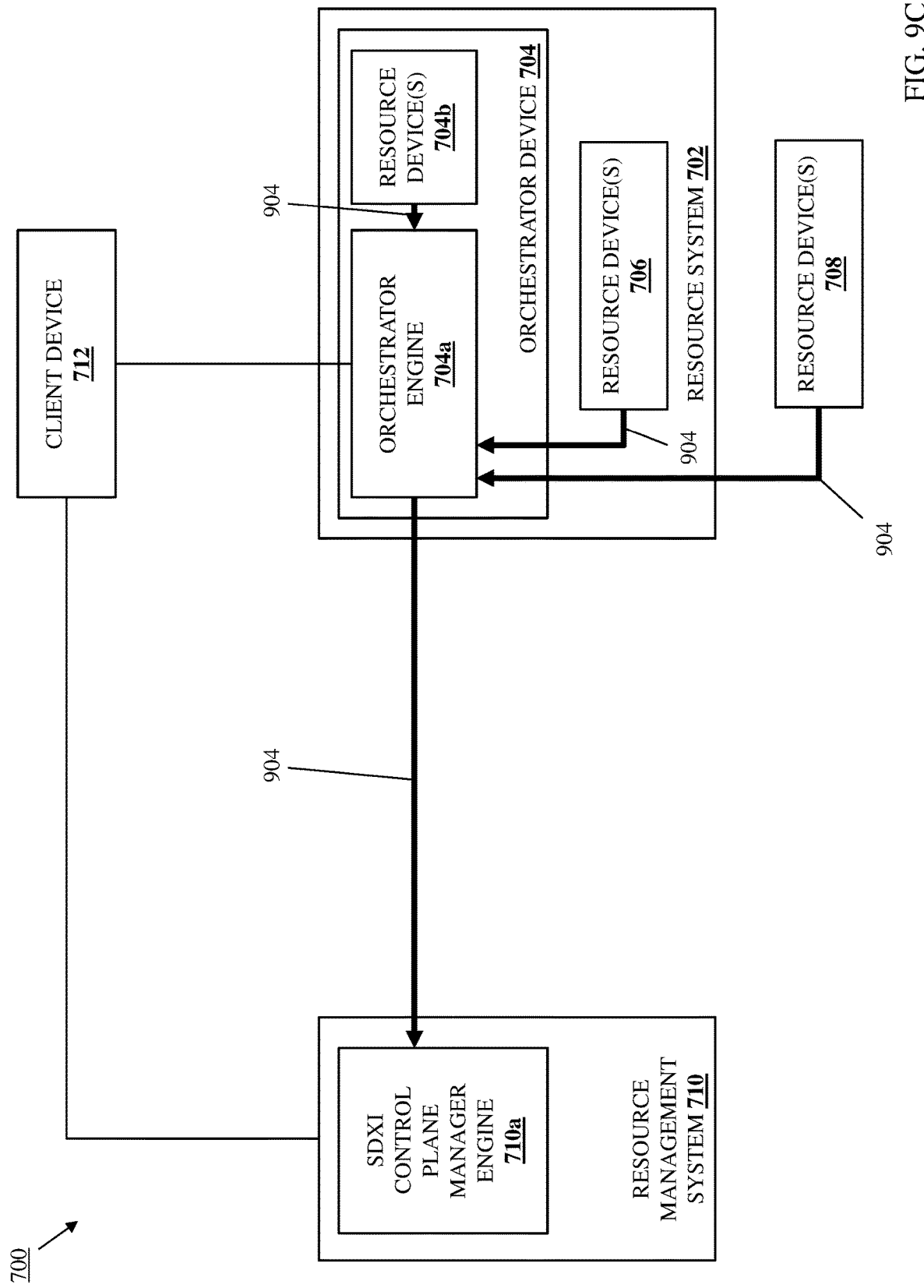
FIG. 9C is a schematic view illustrating an embodiment of the LCS SDXI data plane configuration system of FIG. 7 operating during the method of FIG. 8.
Figure 9D:
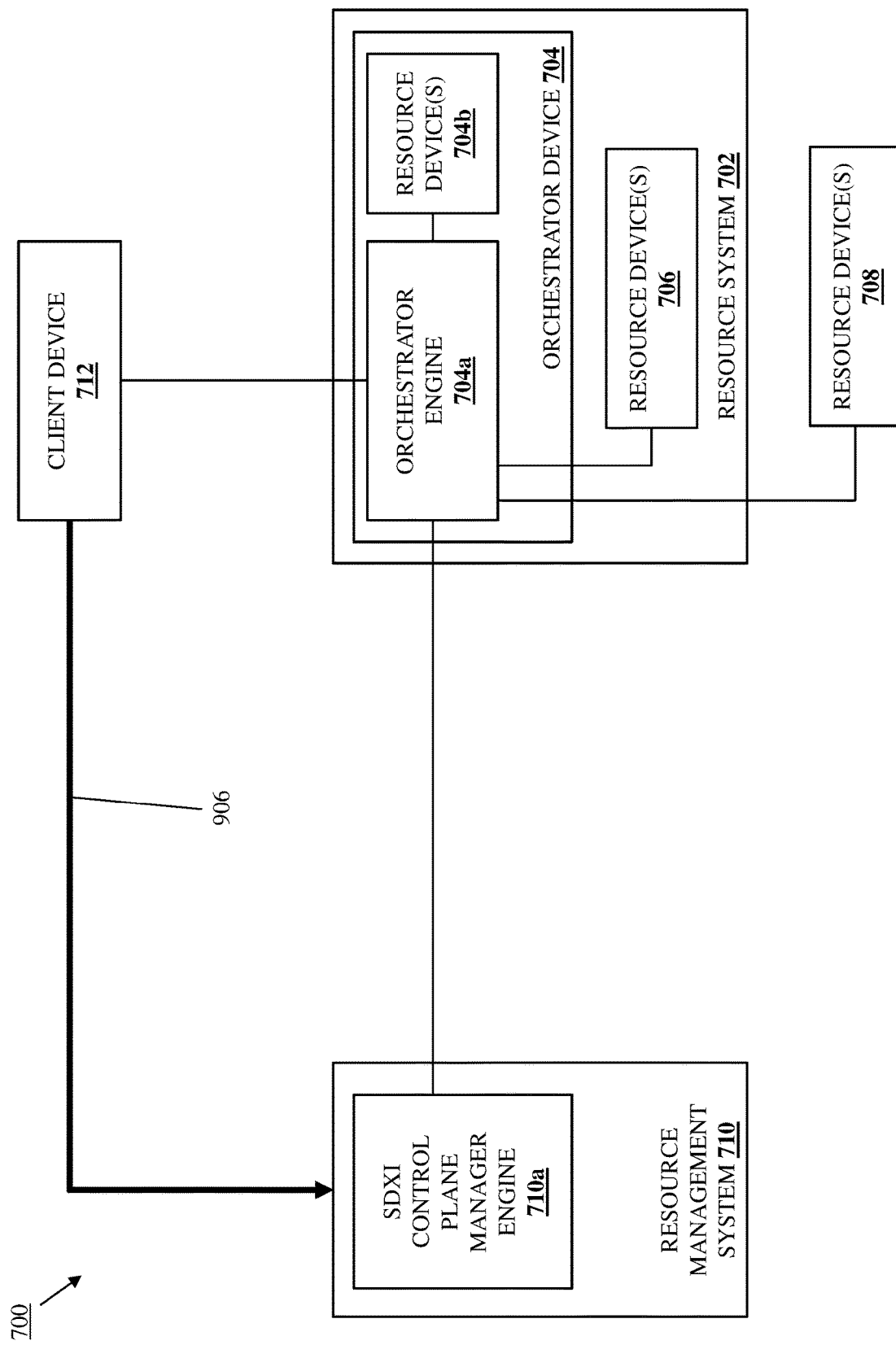
FIG. 9D is a schematic view illustrating an embodiment of the LCS SDXI data plane configuration system of FIG. 7 operating during the method of FIG. 8.

The method 800 then proceeds to block 804 where the resource management system identifies memory subsystem capabilities of memory subsystem(s) included in the SDXI node(s). With reference to FIG. 9B, in an embodiment of block 804, the SDXI control plane manager engine 710a in the resource management system 710 may perform memory subsystem capabilities identification operations 902 that include transmitting a memory subsystem capabilities reporting request to SDXI node(s) provided by any of the resource device(s) 704b included on the orchestrator device 704, any of the resource device(s) 706 included in the resource system 702 but not included on the orchestrator device 704, and/or any of the resource device(s) 708 located outside of the resource system 702. With reference to FIG. 9C, in an embodiment of block 804 and in response to receiving the memory subsystem capabilities reporting request, the SDXI node(s) provided by any of the resource device(s) 704b included on the orchestrator device 704, any of the resource device(s) 706 included in the resource system 702 but not included on the orchestrator device 704, and/or any of the resource device(s) 708 located outside of the resource system 702, may perform memory subsystem capabilities reporting operations 904 that include transmitting a memory subsystem capabilities report to the SDXI control plane manager engine 710a in the resource management system 710. As such, at block 804 the SDXI control plane manager engine 710a in the resource management system 710 may identify the memory capabilities of the memory subsystem included in any SDXI node provided by any of the resource devices 704a, 706, and/or 708.

For example, as discussed above, an SDXI node may be provided by any of the resource device(s) 704b, 706, and 708 (e.g., it may include a memory subsystem and an SDXI node engine provided by that resource device) and, as illustrated in FIGS. 9B and 9C, the SDXI control plane manager engine 710a in the resource management system 710 may transmit the memory subsystem capabilities reporting request via the orchestrator device 704 to the SDXI node engine included in any resource device, and receive the memory subsystem capabilities report back from that SDXI node engine via the orchestrator device 704. However, in embodiments in which a resource device includes a direct coupling with the resource management system 710, the memory subsystem capabilities reporting request and the memory subsystem capabilities report may be exchanged directly between the SDXI control plane manager engine 710a and the SDXI node engine in any resource device. As such, at block 804 the SDXI control plane manager engine 710a in the resource management system 710 may identify the memory capabilities of the memory subsystem included in any SDXI node provided by any of the resource devices 704a, 706, and/or 708.

In another example, as discussed above, an SDXI node may be provided by any of the resource device(s) 704b, 706, and 708 (e.g., it may include a memory subsystem provided by that resource device) and the orchestrator device 704a (e.g., the orchestrator device 704a may perform the SDXI node engine operations discussed above). As such, similarly as illustrated in FIGS. 9B and 9C, the SDXI control plane manager engine 710a in the resource management system 710 may transmit the memory subsystem capabilities reporting request to the orchestrator engine 704a in the orchestrator device 704, and may receive the memory subsystem capabilities report back from the orchestrator engine 704a in the orchestrator device 704, and in some situations those operations may not involve the resource device(s) 704b, 706, and 708 (e.g., when the orchestrator engine 704a has previously identified the memory subsystem capabilities of the memory subsystems in those resource device(s) 704b, 706, and 708). As such, at block 804 the SDXI control plane manager engine 710a in the resource management system 710 may identify the memory capabilities of the memory subsystem included in any SDXI node provided by a combination of the orchestrator device 704 and any of the resource devices 704a, 706, and/or 708. Furthermore, while not illustrated or described in detail, one of skill in the art in possession of the present disclosure will appreciate how an orchestrator device in a resource system that includes any of the resource device(s) 708 may operate to receive the memory subsystem capabilities reporting request and provide the memory subsystem capabilities report while remaining within the scope of the present disclosure as well.

In an embodiment, the memory subsystem capabilities report discussed above may identify any of a variety of capabilities of the memory subsystems included in any of the SDXI nodes discovered at block 802. For example, a memory subsystem capabilities report provided by an SDXI node engine or the orchestrator engine 704a that provides an SDXI node may identify a type of memory device that provides that memory subsystem, a size of that memory subsystem, connection details for that memory subsystem (e.g., to the orchestrator device), and/or any other memory subsystem capabilities that would be apparent to one of skill in the art in possession of the present disclosure. To provide a specific example, a memory subsystem capabilities report may identify that a memory subsystem in an SDXI node is provided by a High Bandwidth Memory (HBM) memory device and HBM memory interface, with a memory subsystem size of 2 GB. In another specific example, a memory subsystem capabilities report may identify that a memory subsystem in an SDXI node is provided by a Persistent MEMory (PMEM) memory device and includes a memory subsystem size of 100 GB. In yet another specific example, a memory subsystem capabilities report may identify that a memory subsystem in an SDXI node includes a memory subsystem size of 1 TB and is connected to the orchestrator device 704 by a 100 GbE network connection.

However, while several specific examples of memory subsystem capabilities of memory subsystems in SDXI nodes have been described, one of skill in the art in possession of the present disclosure will appreciate that any memory subsystem capabilities of SDXI nodes in the LCS SDXI data plane configuration system 700 of the present disclosure may be identified at block 804 while remaining within the scope of the present disclosure as well. As such, following block 804, the SDXI control plane manager engine 710a in the resource management system 710 may have identified the memory subsystem capabilities of any SDXI nodes that include or are provided by the resource device(s) 704b, 706, and/or 708 coupled to the orchestrator device 704, and may store the memory subsystem capabilities of those SDXI nodes in a database that is accessible to the SDXI control plane manager engine 710a and in association with those SDXI nodes and the orchestrator device 704 in order to, for example, allow any LCSs that are subsequently composed for provisioning by the orchestrator device 704 to be provided an SDXI data plane using any of those SDXI nodes, as discussed in further detail below.

The method 800 then proceeds to decision block 806 where it is determined whether an LCS request has been received. In an embodiment, at decision block 806, the resource management system 710 may operate to monitor whether an LCS request to compose an LCS has been received from the client device 712. As discussed above and in further detail below, client devices may provide workload intents to the resource management system 710 in order to request the composition of an LCS for performing a workload, and one of skill in the art in possession of the present disclosure will appreciate how the resource management system 710 may monitor for such a workload intent in a variety of manners that will fall within the scope of the present disclosure as well.

If, at decision block 806, it is determined that an LCS request has not been received, the method 800 returns to block 802. As such, the method 800 may loop such that that the resource management system operates to discover SDXI nodes in the resource device(s) 704b, 706, and 708 coupled to the orchestrator device 704, and identify the memory subsystem capabilities of those SDXI nodes, as long as no LCS request has been received. As will be appreciated by one of skill in the art in possession of the present disclosure, resource devices and SDXI nodes provided by those resource devices may be disconnected from the orchestrator device 704 and/or connected to the orchestrator device 704 over time, and thus the looping of the method 800 between blocks 802, 804, and 806 (i.e., as long as no LCS request has been received) will cause the SDXI control plane manager engine 710a in the resource management system 710 to dynamically and continuously update the SDXI nodes coupled to the orchestrator device 704 in order to, for example, remove SDXI nodes from their association with the orchestrator device 704 in its database during a second iteration of the method 800 subsequent to their disconnection from the orchestrator device 704 subsequent to their discovery during a first iteration of the method 800, add SDXI nodes as being associated with the orchestrator device 704 in its database during a second iteration of the method 800 that were not discovered during the first iteration of the method and connected to the orchestrator device 704 prior the second iteration of the method 800, etc. As such, the availability of SDXI nodes for use in providing a data plane for LCSs that will be provided using the orchestrator device 704 may update dynamically as those SDXI nodes are connected to and disconnected from the orchestrator device 704.

If at decision block 806, it is determined that an LCS request has been received, the method 800 proceeds to block 808 where the resource management system composes an LCS including an SDXI data plane provided by SDXI node(s) based on one or more capabilities requirement(s) in the LCS request being satisfied by memory subsystem capabilities of the memory subsystem(s) included in the SDXI node(s). In an embodiment, at decision block 806, the client device 712 may perform LCS request operations 906 that may include transmitting an LCS request to the resource management system 710. As discussed above, the client device 712 may provide the LCS request at decision block 806 as a "workload intent" that describes the general requirements of a workload that a user of the client device 712 would like to perform, although other techniques for requesting an LCS will fall within the scope of the present disclosure as well. As such, one of skill in the art in possession of the present disclosure will appreciate how the LCS request/workload intent may allow for the identification of one or more capability requirements (e.g., the processing requirements, memory requirements, storage requirements, networking requirements, etc. of an LCS as determined by the workload intent as discussed above) for the requested LCS that will enable it to perform the workload. However, while a specific LCS request has been described, one of skill in the art in possession of the present disclosure will appreciate that other techniques for requesting an LCS will fall within the scope of the present disclosure as well.

As such, at decision block 806 the resource management system 710 may determine that an LCS request has been received from the client device 712 and, in response, at block 808 the resource management system 710 may operate to compose an LCS based on the resource device(s) 704*b*, 706, and/or 708 similarly as discussed above. In a specific example, based on the capability requirements identified in the workload intent/LCS request, the resource management system 710 may identify a processing system and memory system included in the resource device(s) 706 in the resource system 702 and compose the LCS such that that processing system and memory system may be configured to provide an operating system for the LCS. Furthermore, in this specific example, the resource management system 710 may identify a storage system and networking system included in the resource device(s) 706 in the resource system 702 and/or the resource device(s) 708 outside the resource system 702 for use by the operating system of the LCS. Further still, in this specific example, the resource management system 710 may identify the resource device(s) 704*b* included on the orchestrator device 704 for use by the operating system of the LCS.

In addition, at block 808, the resource management system 710 may identify memory resources provided by one or more of the SDXI nodes discovered at block 802 for use by the operating system of the LCS. For example, using on the capability requirements identified from the workload intent/LCS request, the resource management system 710 may access its database that associates the SDXI nodes with their memory subsystem capabilities in order to determine whether any of the capability requirements of the LCS are satisfied by the memory subsystem capabilities of the SDXI nodes. Thus, continuing with the specific memory subsystem capabilities requirements provided in the examples above, the resource management system 710 may determine whether the capabilities requirements for the LCS include particular memory types (e.g., HBM memory with HBM memory device(s) and HBM memory interface(s), PMEM memory with PMEM memory devices, etc.), particular memory sizes (e.g., 2 GB, 100 GB, 1 TB, etc.), particular memory network connection bandwidths (e.g., a 100 GbE network connection to the memory), etc. As such, at block 808 the resource management system 710 may compose an LCS based on the LCS request received at decision block 806 using any of the SDXI nodes discovered at block 802.

As such, at block 808, the resource management subsystem 710 may compose the LCS at block 808 using SDXI nodes backed by, provided by, or otherwise including memory subsystems in different memory systems (e.g., a memory subsystem provided by a memory system in one of the resource device(s) 706 and a memory subsystem provided by a memory system in one of the resource device(s) 708), memory subsystems in memory devices of different memory types (a memory subsystem provided by a first type of memory device and a memory subsystem provided by a second type of memory device), and/or backed a variety of different memory subsystem components and configurations that would be apparent to one of skill in the art in possession of the present disclosure.

Figure 9E:
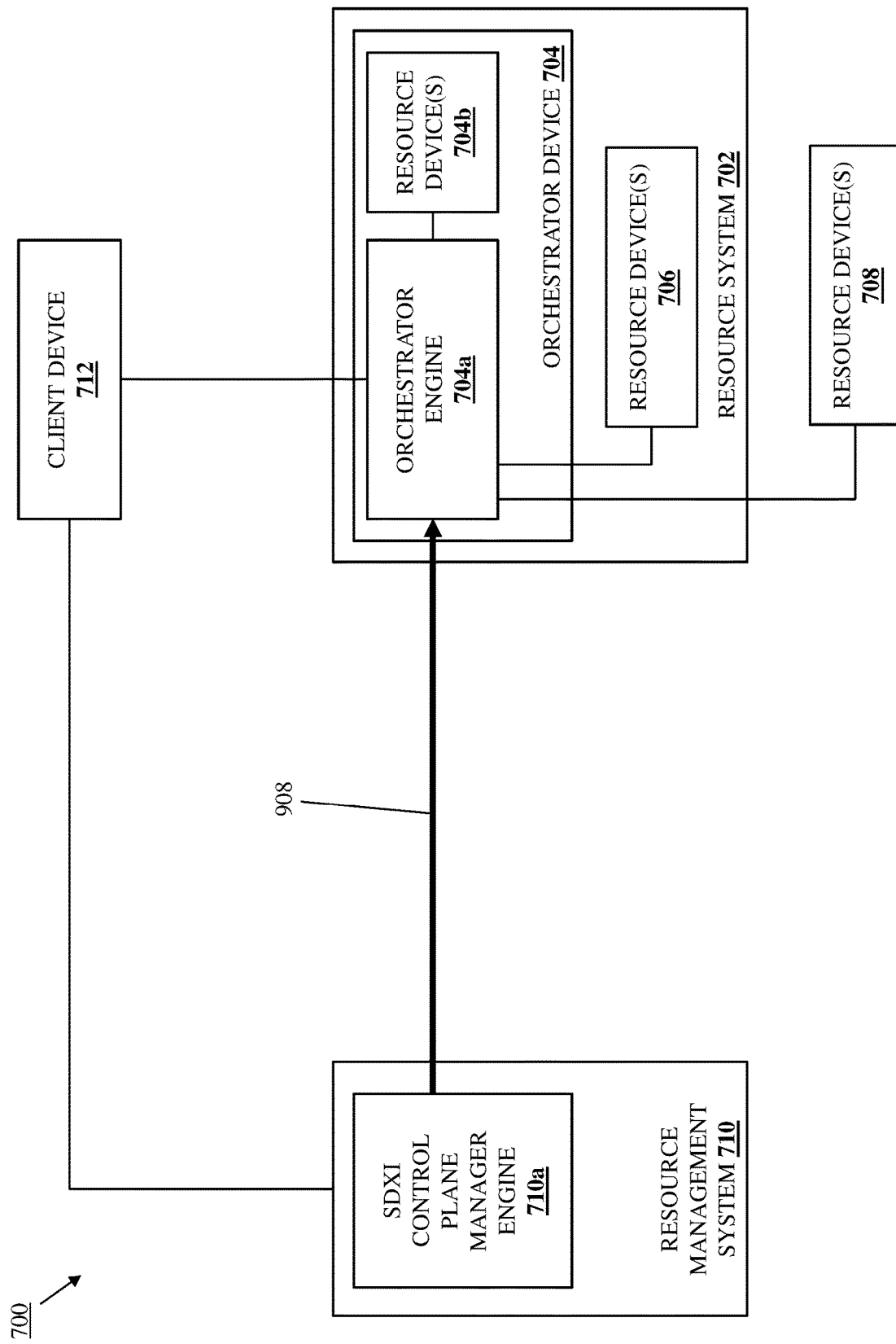
FIG. 9E is a schematic view illustrating an embodiment of the LCS SDXI data plane configuration system of FIG. 7 operating during the method of FIG. 8.

With reference to FIG. 9E, in response to composing the LCS, the resource management system 710 may perform LCS provisioning instruction operations 908 that may include transmitting LCS provisioning instructions to the orchestrator engine 704*a* in the orchestrator device 704. Furthermore, the LCS provisioning instruction operations 908 may also include the SDXI control plane manager engine 710*a* providing instructions, commands, and/or other information that is configured to map the SDXI nodes that were used to compose the LCS and that are provided by the resource device(s) 704*b*, 706, and/or 708 (and in some cases, the orchestrator engine 704*a*) to an SDXI data plane for the LCS.

Figure 9F:
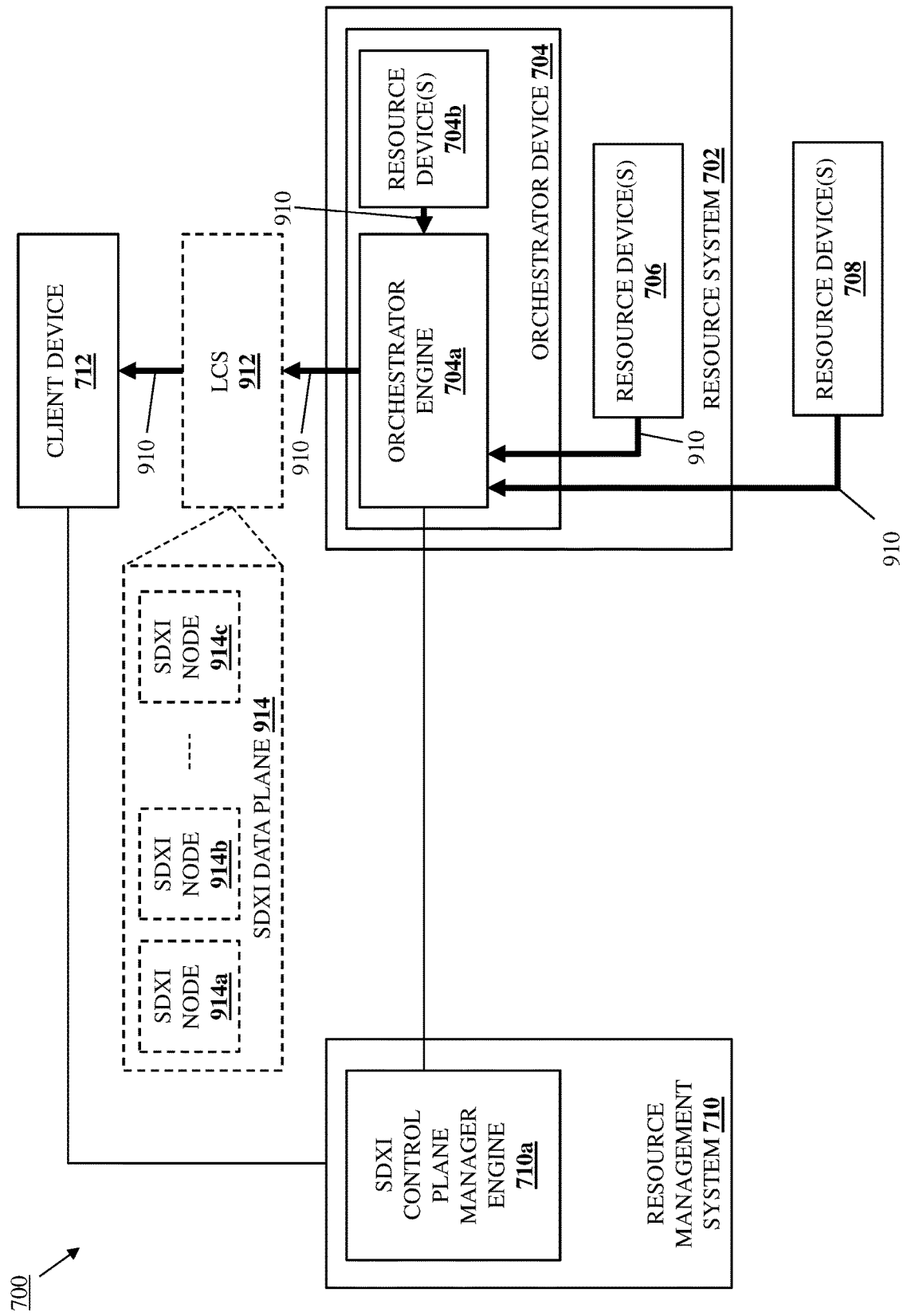
FIG. 9F is a schematic view illustrating an embodiment of the LCS SDXI data plane configuration system of FIG. 7 operating during the method of FIG. 8.

With reference to FIG. 9F, in response to receiving the LCS provisioning instructions, the orchestrator engine 704*a* may perform LCS provisioning operations 910 that include using the resource device(s) 704*b*, 706, and 708 to provide an LCS 912 to the client device 712 similarly as discussed above. Furthermore, the LCS provisioning operations 910 include providing the LCS 912 including an SDXI data plane 914 providing one or more SDXI nodes 914*a*, 914*b*, and up to 914*c*, any of which may be provided by one of the resource device(s) 704*b*, 706, and 708 (and in some cases the orchestrator engine 704*a* as well), as discussed above. For example, the microvisor or hypervisor provided by the orchestrator engine 704*a* may integrate with the SDXI control plane manager engine 710*a* and operate with other components of the orchestrator engine 704*a*/orchestrator device 704 to provide the LCS and the SDXI data plane using the SDXI node(s) 914*a*, 914*b*, and/or 914*c*. As such, one of skill in the art in possession of the present disclosure will recognize that the LCS (e.g., an application provided on the LCS) may utilize (e.g., at the instruction of the client device 712) the SDXI node(s) 914*a*, 914*b*, and/or 914*c* that provide the SDXI data plane 904 in order to perform the SDXI memory-to-memory data transfers/transforms discussed above, as well as perform any other SDXI data plane operations that would be apparent to one of skill in the art in possession of the present disclosure.

As will be appreciated by one of skill in the art in possession of the present disclosure, each of the SDXI nodes 914*a*-914*c* may include a configuration interface that enables their management by the SDXI control plane manager engine 710*a*, and thus may each be configured to provide an SDXI data resource target and responder in order to provide a respective resource target for the SDXI data plane 914. Furthermore, the LCS 912 may discover and utilize any resources presented to it by the orchestrator device 704 and backed by the resource device(s) 704*b*, 706, and/or 708 (e.g., processing systems, memory systems, storage systems, networking systems, etc.), and one or more of those resources (e.g., memory resources, storage resources, etc.) may be backed by any of the SDXI nodes 914*a*-914*c* and/or the SDXI data plane 814. As will be appreciated by one of skill in the art in possession of the present disclosure, the SDXI data plane 914/SDXI nodes 914*a*-914*c* may provide a consistent access and programming model for the LCS 914 that is independent of the resource devices that are backing the SDXI data plane 914.

As such, one of skill in the art in possession of the present disclosure will appreciate how the SDXI control plane manager engine 710*a* may operate to provide the LCS 912 with the SDXI data plane 914 backed by SDXI-enabled resource devices, and may operate with the orchestrator engine 704*a* (e.g., a microvisor, hypervisor, etc.) to allow the LCS 912 to access those SDXI-enabled resource devices with varying levels of abstraction depending on the SDXI access capabilities of the LCS 912. As such, the SDXI control plane manager engine 710*a* and orchestrator engine 704*a* may control how the SDXI data plane 914 is visible to and/or accessible to the LCS 912. Thus, as discussed below, the "envelope" of the SDXI data plane 914 may include application address space, virtual machine address space, Java Virtual Machine (JVM) address space, addresses spaces provided by two or more of the SDXI nodes, etc. Furthermore, in some embodiments, the LCS 912 may not have the SDXI data plane 914 assigned directly to it, and that SDXI data plane 914 may instead be assigned to the resource system 702 hosting the LCS 912 (e.g., a BMS system with the processing system and resource system that provide an operating system for the LCS 912), with the LCS 912 utilizing the SDXI data plane 914 via a service (e.g., a file service) that has been modified to utilize the SDXI data plane 914.

Figure 12:
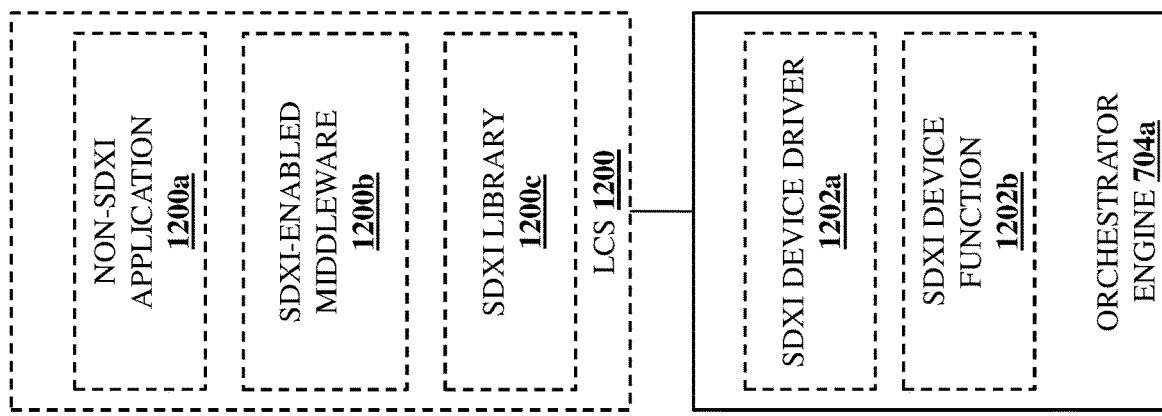
FIG. 12 is a schematic view illustrating an embodiment of an LCS that may be provided during the method of FIG. 8.

With reference to FIGS. 10, 11, and 12, different embodiments of the LCS 912 are illustrated that may be provided based on how the SDXI data plane 914 provided with the LCS 912 is abstracted by the SDXI control plane manager engine 710*a* and orchestrator engine 704*a*, and one of skill in the art in possession of the present disclosure will appreciate how relatively tight integration of the SDXI control plane manager engine 710*a* and the needs of the LCS 912 will allow the most feasible abstraction interface between the LCS 912 and the SDXI data plane 914 to be provided. For example, FIG. 10 illustrates an LCS 1000 that may be provided by the orchestrator engine 704*a* as the LCS 912 with the SDXI data plane 914. As will be appreciated by one of skill in the art in possession of the present disclosure, the LCS 1000 illustrated in FIG. 10 is an example of an SDXI-memory-space-aware LCS that can "see" the SDXI memory space provided by the SDXI data plane 914 and that is configured to directly instruct the SDXI memory-to-memory data transfers/transforms discussed above. As such, the LCS 1000 may include an SDXI-enabled application 1000*a*, an SDXI library 1000*b*, an SDXI device driver 1000*c*, and an SDXI device function 1000*d*, and one of skill in the art in possession of the present disclosure will appreciate how the SDXI-enabled application 1000*a* may utilize the SDXI library 1000*b*, the SDXI device driver 1000*c*, and the SDXI device function 1000*d* to provide SDXI memory-to-memory data transfer/transform instructions (e.g., using SDXI descriptors, SDXI functions, etc.) via the orchestrator engine 704*a* to the SDXI-enabled resource devices in order to cause SDXI memory-to-memory data transfers/transforms between memory address space that is provided by the SDXI node(s) 914*a*-914*c* in the SDXI data plane 914 and that is included in memory subsystems provided by the resource device(s) 704*b*, 706, and 708.

In another example, FIG. 11 illustrates an LCS 1100 that may be provided by the orchestrator engine 704*a* as the LCS 912 with the SDXI data plane 914. As will be appreciated by one of skill in the art in possession of the present disclosure, the LCS 1100 illustrated in FIG. 11 is an example of a non-SDXI-memory-space-aware LCS that cannot "see" the SDXI memory space provided by the SDXI data plane 904 and that is not capable of directly instructing the SDXI memory-to-memory data transfers/transforms discussed above. As such, the LCS 1100 may include a non-SDXI-enabled application 1100*a*, while the orchestrator engine 704*a* includes an SDXI-enabled service 1102*a*, an SDXI library 1102*b*, an SDXI device driver 1102*c*, and an SDXI device function 1102*d*, and one of skill in the art in possession of the present disclosure will appreciate how the SDXI-enabled service 1102*a* may receive data transfer instructions from the non-SDXI application 1100*a* and utilize the SDXI library 1102*b*, the SDXI device driver 1102*c*, and the SDXI device function 1102*d* in order to provide SDXI memory-to-memory data transfer/transform instructions (e.g., using SDXI descriptors, SDXI functions, etc.) to the SDXI-enabled resource devices that cause SDXI memory-to-memory data transfers/transforms between memory address space that is provided by the SDXI node(s) 914*a*-914*c* in the SDXI data plane 914 and that is included in memory subsystems provided by the resource device(s) 704*b*, 706, and 708. As such, the non-SDXI application 1100*a* and the LCS 1100 may instruct non-SDXI data transfers, and the orchestrator engine 704*a* may cause SDXI memory-to-memory data transfers/transforms to be performed in response and without the knowledge of the non-SDXI application 100*a* and the LCS 1100.

In another example, FIG. 12 illustrates an LCS 1200 that may be provided by the orchestrator engine 704*a* as the LCS 912 with the SDXI data plane 914. As will be appreciated by one of skill in the art in possession of the present disclosure, the LCS 1200 illustrated in FIG. 12 is an example of an LCS that has been modified to instruct the SDXI memory-to-memory data transfers/transforms discussed above for non-SDXI applications that cannot "see" the SDXI memory space provided by the SDXI data plane 904 and that are not capable of instructing the SDXI memory-to-memory data transfers/transforms discussed above. As such, the LCS 1200 may include a non-SDXI-enabled application 1200*a*, SDXI-enabled middleware 1200*b*, and an SDXI library 1200*c*, while the orchestrator engine 704*a* may include an SDXI device driver 1202*c* and an SDXI device function 1202*d*, and one of skill in the art in possession of the present disclosure will appreciate how the SDXI-enabled middleware 1200*b* may receive data transfer instructions from the non-SDXI application 1200*a* and utilize the SDXI library 1200*c* in the LCS 1200, as well as the SDXI device driver 1202*a* and the SDXI device function 1202*b* in the orchestrator engine 704*a*, in order to provide SDXI memory-to-memory data transfer/transform instructions (e.g., using SDXI descriptors, SDXI functions, etc.) to the SDXI enabled resource devices that cause SDXI memory-to-memory data transfers/transforms between memory address space that is provided by the SDXI node(s) 914*a*-914*c* in the SDXI data plane 914 and that is included in memory subsystems provided by the resource device(s) 704*b*, 706, and 708. Furthermore, while illustrated and described as being included in the orchestrator engine 704*a*, the SDXI device driver 1202*c* and an SDXI device function 1202*d* may be included in the LCS 1200 while remaining within the scope of the present disclosure as well.

As such, the non-SDXI application 1200*a* may instruct non-SDXI data transfers, and the SDXI-enabled middleware 1200*b* may cause SDXI memory-to-memory data transfers/transforms to be performed without the knowledge of the non-SDXI application 1200*a* and the LCS 1200. In a specific example, the SDXI-enabled middleware 1200*b* may utilize a GNU C Library (glibc), a Java Virtual Machine (JVM), or a Structured Query Language (SQL) application to perform a memcopy on behalf of the non-SDXI-enabled application 1200*a* and between memory address space that is provided by the SDXI node(s) 914*a*-914*c* in the SDXI data plane 914 and that is included in memory subsystems provided by the resource device(s) 704*b*, 706, and 708, with that memcopy initiated by the following "Int sdxi_memcpy(dst, src) command:

```
{
  #ifdef SDXI_MEMCPY
  {
    Perform_dma(dst, src)
  }
  #else
  {
    Mov [mem], RAX
  }
}
```

While not discussed in detail herein, and similarly as discussed above, SDXI-enabled resource devices that provide (or are included in) the SDXI nodes may be connected to and disconnected from the orchestrator device 704, and thus the SDXI control plane manager engine 710a and/or the orchestrator engine 704a may operate to remove SDXI nodes from the SDXI data plane 914 and/or add SDXI nodes to the SDXI data plane 914 during the provisioning of the LCS 912, thus providing an SDXI data plane that is dynamically backed by different SDXI nodes/resource devices.

Thus, systems and methods have been described that provide for the configuration of an SDXI data plane for an LCS using SDXI node(s) that are included in the resource device(s) that provide that LCS. For example, the LCS SDXI data plane configuration system of the present disclosure may include a resource management system coupled to an orchestrator device that is coupled to a plurality of resource devices. The resource management system discovers a first SDXI node in the plurality of resource devices, with the first SDXI node configured to process SDXI information and including a first memory subsystem that is configured to provide an SDXI memory space. The resource management system also identifies first memory system capabilit(ies) of the first memory subsystem included in the first SDXI node and, when the resource management system subsequently receives an LCS request, it composes an LCS that includes an SDXI data plane provided by the first SDXI node based on capabilities requirement(s) identified in the LCS request being satisfied by the first memory subsystem capabilit(ies) of the first memory subsystem included in the first SDXI node. As such, an LCS may be provided an SDXI data plane made up of one or more memory subsystem, and in many cases may be provided an SDXI data plane made up of different memory systems and/or different types of memory devices.

Figure 13:
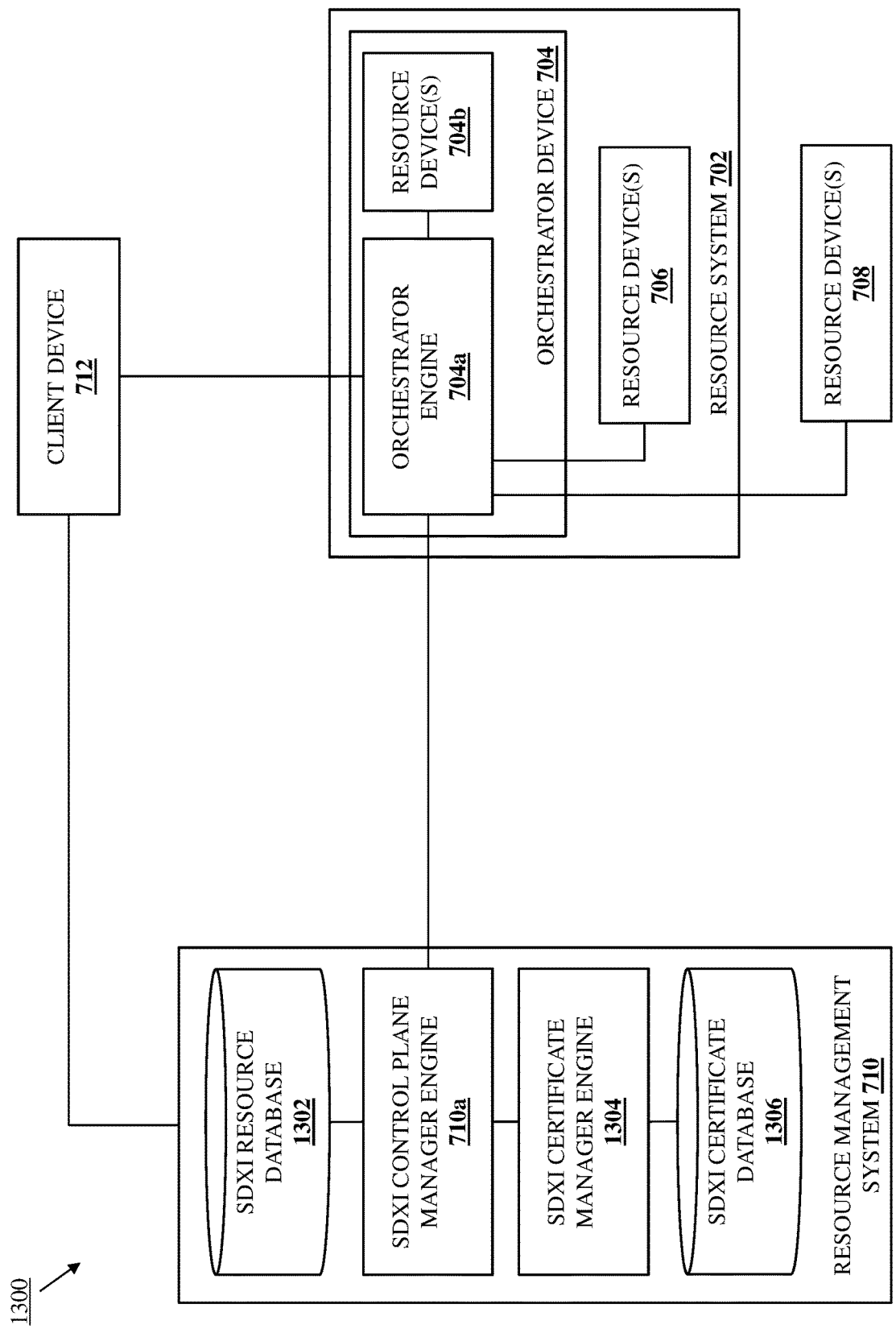
FIG. 13 is a schematic view illustrating an embodiment of an LCS SDXI resource ownership system provided according to the teachings of the present disclosure.

With reference to FIG. 13, an embodiment of an LCS SDXI resource ownership system 1300 is illustrated that may be provided according to the teachings of the present disclosure. In the illustrated embodiment, the LCS SDXI resource ownership system 1300 is similar to the LCS SDXI data plane configuration system 700 discussed above with reference to FIG. 7, and thus similar elements have been provided with the same element numbers. However, in addition to the components discussed above with reference to the SDXI data plane configuration system 700 of FIG. 7, the resource management system 710 may also include a storage system (not illustrated, but which may be provided by the storage device 108 discussed above with reference to FIG. 1) that is coupled to the SDXI control plane manager engine 1304 (e.g., via a coupling between the storage system and the processing system) and that provides an SDXI resource database 1302 that may include any of the information utilized by the SDXI control plane manager engine 710a discussed above. For example, the SDXI resource database 1302 may be utilized by the SDXI control plane manager engine 710a to store the identities of SDXI nodes discussed above, the memory capabilities of memory subsystems included in SDXI nodes discussed above, as well as any of the other SDXI resource information described below.

Furthermore, in addition to the components discussed above with reference to the SDXI data plane configuration system 700 of FIG. 7, the resource management system 710 may also include a processing system, along with a memory system that includes instruction that, when executed by the processing system, cause the processing system to provide an SDXI certificate manager engine 1304 that is configured to perform any of the functionality described below for the SDXI certificate manager engine 1304 and/or the resource management system 710. The resource management system 710 may also include a storage system (not illustrated, but which may be provided by the storage device 108 discussed above with reference to FIG. 1) that is coupled to the SDXI certificate manager engine 1304 (e.g., via a coupling between the storage system and the processing system) and that includes an SDXI certificate database 1306 that may include any of the information utilized by the SDXI certificate manager engine 1304 discussed above.

As discussed in further detail below, the LCS SDXI resource ownership system 1300 may include an SDXI controller subsystem that may be provided by one or more of the orchestrator engine 704a, the SDXI control plane manager engine 710a, and/or the SDXI certificate manager engine 1304. For example, a respective processing system/memory system combination in one or more of the orchestrator engine 704a, the SDXI control plane manager engine 710a, and/or the SDXI certificate manager engine 1304 may provide an SDXI controller engine via instruction on the memory system(s) that, when executed by the processing system(s), cause the processing system(s) to provide the SDXI controller engine that is configured to perform the functionality of the SDXI controller engines and/or SDXI controller subsystems discussed below. As such, while some of the operations of the SDXI controller subsystem are illustrated and described below as being perform by one of the orchestrator engine 704a, the SDXI control plane manager engine 710a, and/or the SDXI certificate manager engine 1306, one of skill in the art in possession of the present disclosure will recognize how the orchestrator engine 704a, the SDXI control plane manager engine 710a, and/or the SDXI certificate manager engine 1306 may coordinate, collaborate, and/or otherwise interact to enable any of the SDXI controller subsystem operations described below.

Figure 14:
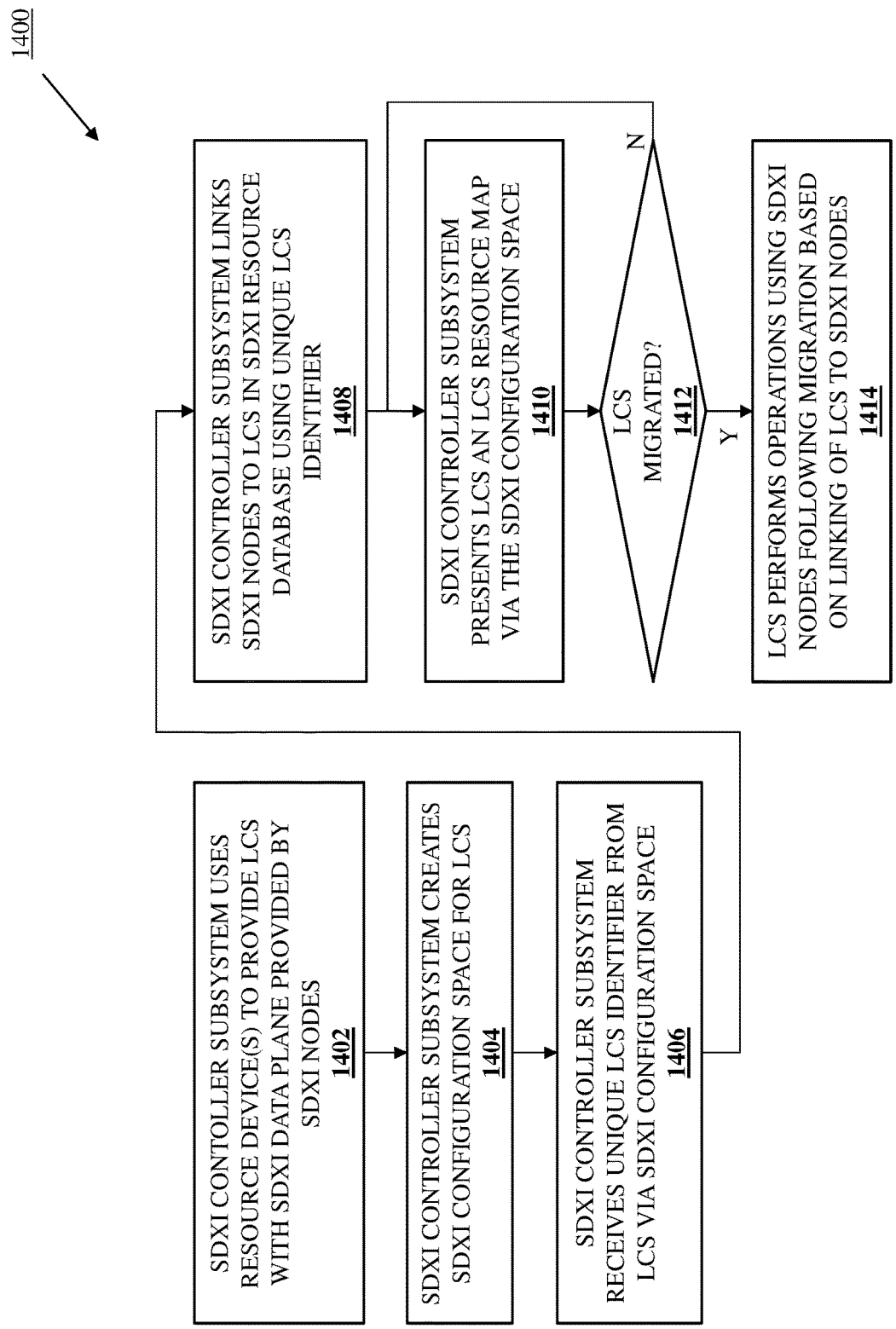
FIG. 14 is a flow chart illustrating an embodiment of a method for providing ownership of SDXI resources for an LCS.

With reference to FIG. 14, a method for providing ownership of SDXI resources for an LCS is illustrated. As discussed below, the systems and methods of the present disclosure provide for the linking of an LCS with the SDXI resources that are used to provide that LCS in order to ensure that those SDXI resources are available for providing that LCS when the LCS is migrated between resource systems. For example, the LCS SDXI resource ownership system of the present disclosure may include a resource system having an orchestrator device coupled to resource devices and a resource management system. An SDXI controller subsystem is provided by the resource management system and/or the orchestrator device, and operates to use the first resource system to provide an LCS with an SDXI data plane provided by an SDXI node included in the resource devices, and create an SDXI configuration space for the LCS. The SDXI controller subsystem then receives a unique LCS identifier from the LCS via the SDXI configuration space, and links the SDXI node to the LCS in an SDXI resource database using the unique LCS identifier. The SDXI controller subsystem then migrates the LCS to a second resource system, and the LCS performs operations using the SDXI node following migration to the second resource system based on the linking of the LCS to the SDXI node. As such, LCSs may be assigned "ownership" of SDXI resources included in a disaggregated and composable architecture that is used to provide LCSs in a manner that provides for the migration of that ownership assignment when an corresponding LCS is migrated between resource systems.

While the LCS SDXI data plane configuration system 700 and the method 800 discussed above provide for the configuration of an SDXI data plane for an LCS, one of skill in the art in possession of the present disclosure will appreciate how the method 800 assumes that the LCS 912 continues to be provided by the orchestrator device 704 and resource system 702 immediately following its composition and provisioning via the resource system 702 (e.g., the provisioning of an operating system for the LCS using a processing system and memory system in the resource system 702) and at least until it completes the workload for which it was composed. However, as discussed above, in many situations the LCS 912 may be provided by different resource systems during its performance of the workload for which it was composed. For example, the LCS may be composed using a first processing system and a first memory system in a first resource system (e.g., a first BMS system) to provide an operating system for the LCS, and then during the performance of the workload for which the LCS was composed, the LCS may be migrated to one or more second resource system(s) (e.g., second BMS system(s)) having second processing system(s) and second memory system(s) that will then provide the operating system for the LCS. As such, the inventors of the present disclosure have developed techniques for assigning ownership of the SDXI resource nodes described above to the LCS they are providing so that migration of the LCS between any number of resource systems/BMS systems will not prevent that LCS (i.e., the operating system in the resource system/BMS system currently providing that LCS following any migration) from utilizing the SDXI resource nodes (and the data that was previously stored on their memory subsystems) following its migration.

Figure 15A:
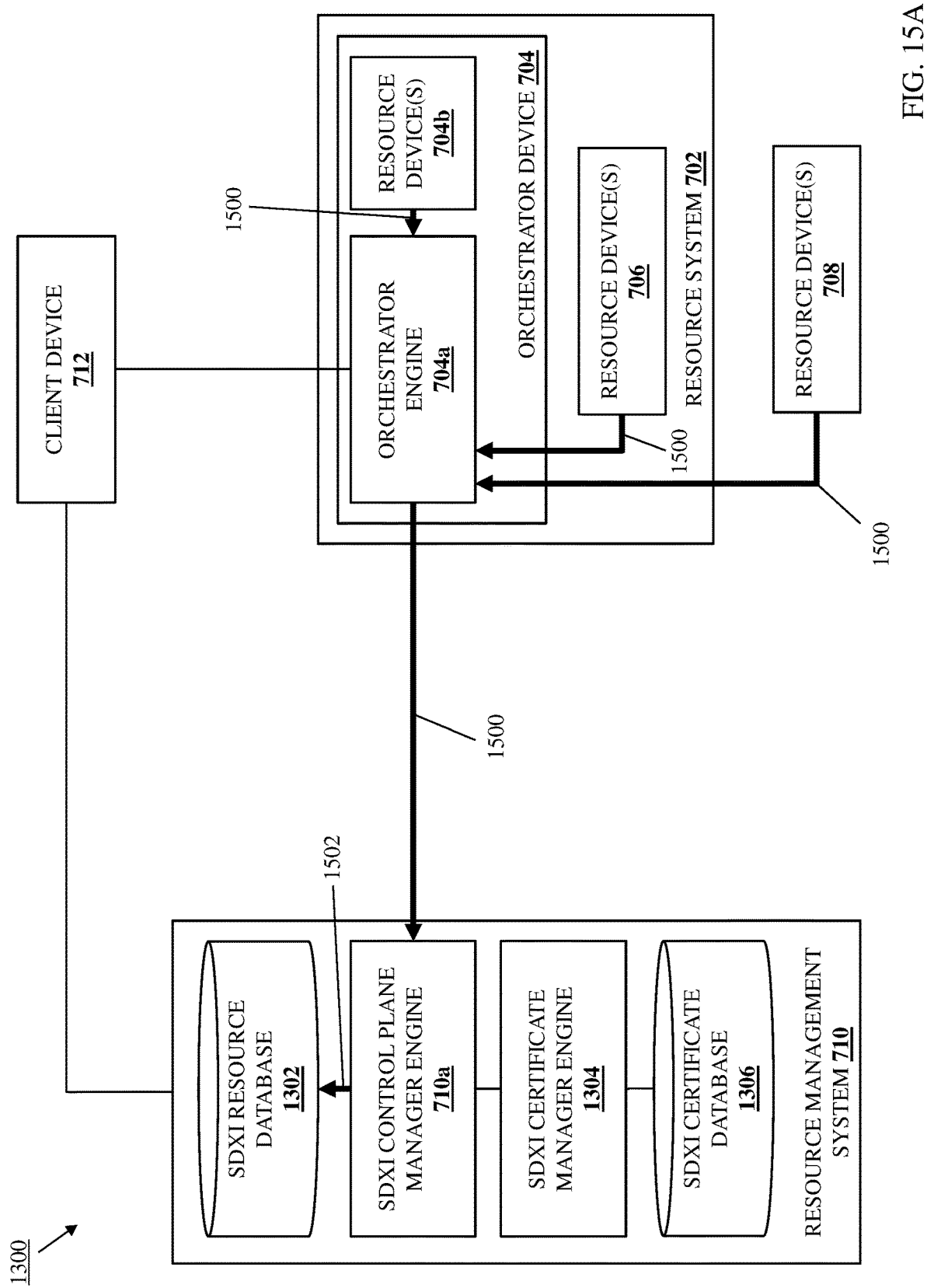
FIG. 15A is a schematic view illustrating an embodiment of the LCS SDXI resource ownership system of FIG. 13 operating during the method of FIG. 14.

The method 1400 begins at block 1402 where an SDXI controller subsystem uses one or more resource devices to provide an LCS with an SDXI data plane provided by SDXI nodes. In an embodiment, at block 1402, the orchestrator device 704 and the resource management system 710 may operate similarly as described above with reference to the method 700 to discover SDXI nodes, identify memory subsystem capabilities of memory subsystems in the SDXI nodes, receive an LCS request from a client device, and provide an LCS to that client device. For example, with reference to FIG. 15A, the SDXI control plane manager engine 710*a* in the resource management system 710 may perform SDXI node discovery and capabilities identification operations 1500 that may include discovering SDXI nodes provided by or including the resource devices 704*b*, 706 and 708 as discussed above with reference to block 802 of the method 800, and identifying the capabilities of the memory subsystems included in those SDXI nodes as discussed above with reference to block 804 of the method 800. As also illustrated in FIG. 15A, in response to performing the SDXI node discovery and capabilities identification operations 1500, the SDXI control plane manager engine 710*a* in the resource management system 710 may perform SDXI node identifier and capability storage operations 1502 that include storing the identities of the discovered SDXI nodes in association with their identified memory subsystem capabilities in the SDXI resource database 1302.

Figure 15B:
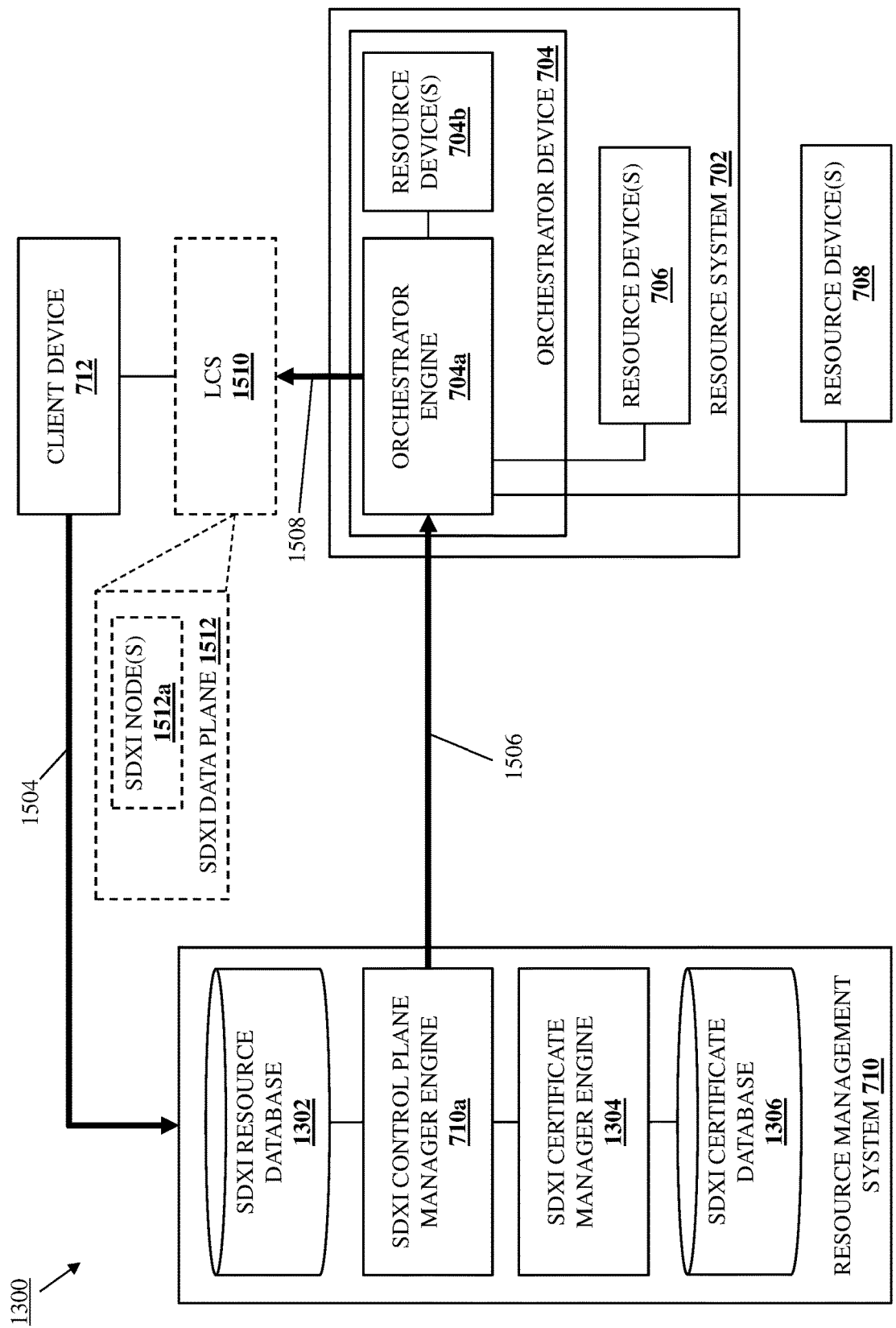
FIG. 15B is a schematic view illustrating an embodiment of the LCS SDXI resource ownership system of FIG. 13 operating during the method of FIG. 14.

With reference to FIG. 15B, in an embodiment of block 1404 and similarly as discussed above, the client device 712 may perform LCS request operations 906 that may include transmitting an LCS request to the resource management system 710. As discussed above, the client device 712 may perform LCS request operations 1504 that may include providing an LCS request to the resource management system 710 that describes the general requirements of a workload that a user of the client device 712 would like to perform, and the LCS request/workload intent may allow for the identification of one or more capability requirements (e.g., the processing requirements, memory requirements, storage requirements, networking requirements, etc. of an LCS as determined by the workload intent as discussed above) for the requested LCS that will enable it to perform the workload.

Similarly as discussed above, in response to receiving the LCS request/workload intent, resource management subsystem 710 may compose the LCS using SDXI nodes backed by, provided by, or otherwise including memory subsystems in different memory systems (e.g., a memory subsystem provided by a memory system in one of the resource device(s) 706 and a memory subsystem provided by a memory system in one of the resource device(s) 708), memory subsystems in memory devices of different memory types (a memory subsystem provided by a first type of memory device and a memory subsystem provided by a second type of memory device), and may perform LCS provisioning instruction operations 1506 that may include transmitting LCS provisioning instructions to the orchestrator engine 704*a* in the orchestrator device 704. Furthermore, the LCS provisioning instruction operations 908 may also include the SDXI control plane manager engine 710*a* providing instructions, commands, and/or other information that is configured to map the SDXI nodes that were used to compose the LCS and that are provided by the resource device(s) 704*b*, 706, and/or 708 (and in some cases, the orchestrator engine 704*a*) to an SDXI data plane for the LCS. In response to receiving the LCS provisioning instructions, the orchestrator engine 704*a* may perform LCS provisioning operations 1508 to provide an LCS 1510 to the client device 712 using the resource device(s) 704*b*, 706, and/or 708, and in particular, with an SDXI data plane 1512 provided by one or more SDXI nodes 1512*a* that are provided by or that include memory subsystem(s) in the resource device(s) 704*b*, 706, and/or 708.

Figure 15C:
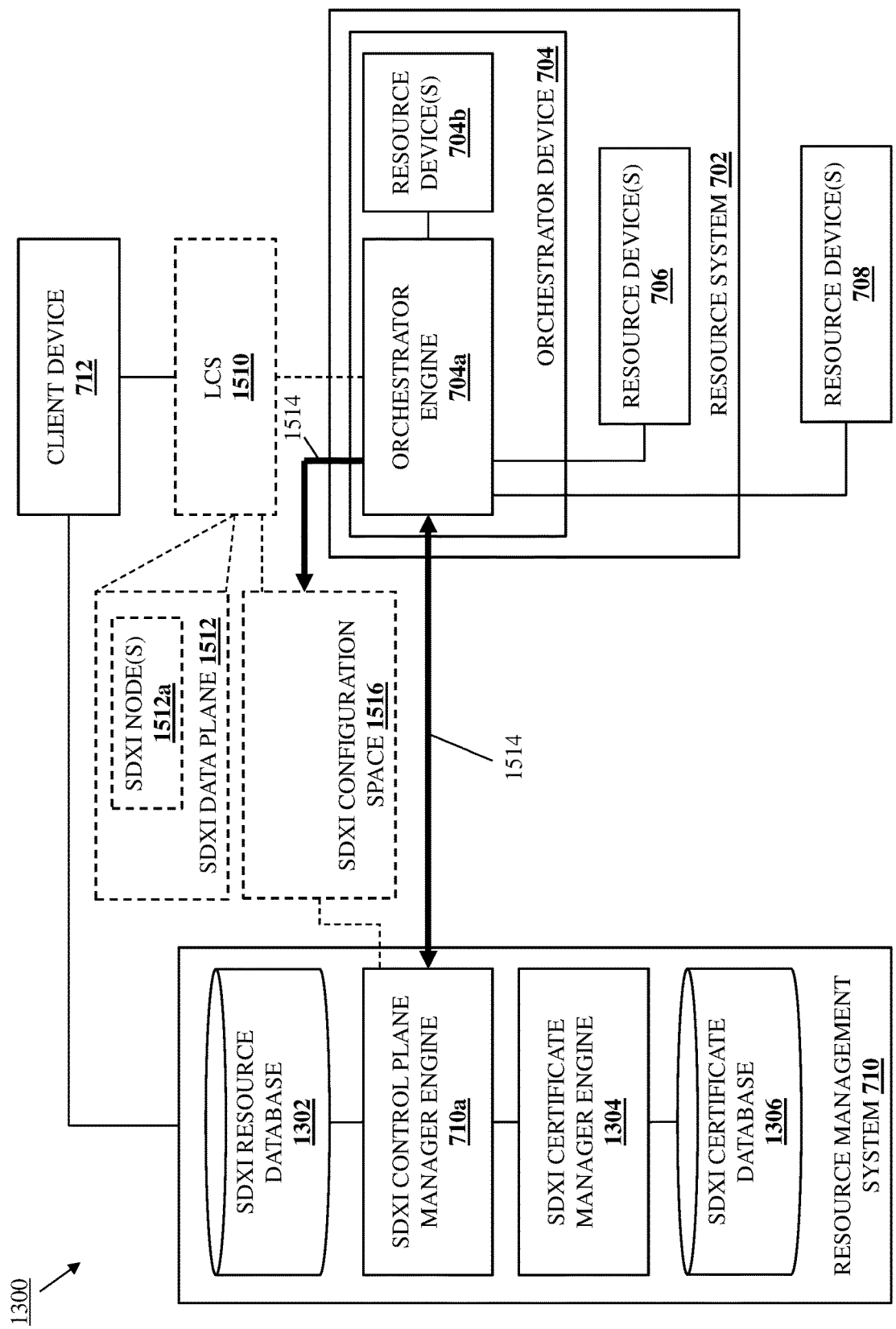
FIG. 15C is a schematic view illustrating an embodiment of the LCS SDXI resource ownership system of FIG. 13 operating during the method of FIG. 14.

The method 1400 then proceeds to block 1404 where the SDXI controller subsystem creates an SDXI configuration space for the LCS. With reference to FIG. 15C, in an embodiment of block 1404, the SDXI controller subsystem provided by the SDXI control plane manager engine 710*a* and/or the orchestrator engine 704*a* may perform SDXI configuration space creation operations 1514 that include creating an SDXI configuration space 1516 for the LCS 1510. For example, in an embodiment of block 1404, the orchestrator engine 704*a* in the orchestrator device 704 (e.g., a microvisor, hypervisor, etc.) may utilize a memory subsystem provided by the resource device(s) 704*b* included on the orchestrator device 704 to provide the SDXI configuration space 1516 for the LCS 1510, and may configure that memory subsystem as a shared memory space that is mapped to the LCS 1510 and the SDXI controller subsystem. As such, one of skill in the art in possession of the present disclosure will appreciate how the SDXI controller subsystem may be an SDXI node that is similar to those described above and that includes a memory subsystem utilized by the LCS 1510, and may operate to use that memory subsystem to provide SDXI configuration spaces that are each specific to an LCS and not accessible by other LCSs provided by the resource system 702/orchestrator device 704 (e.g., the SDXI configuration space 1516 that is specific to the LCS 1510). However, while discussed as being provided using a memory subsystem provided by the resource device(s) 704b included on the orchestrator device 704, the SDXI configuration space 1516 may be provided using a memory subsystem included in the resource device(s) 706 and/or 708 while remaining within the scope of the present disclosure as well.

Figure 15D:
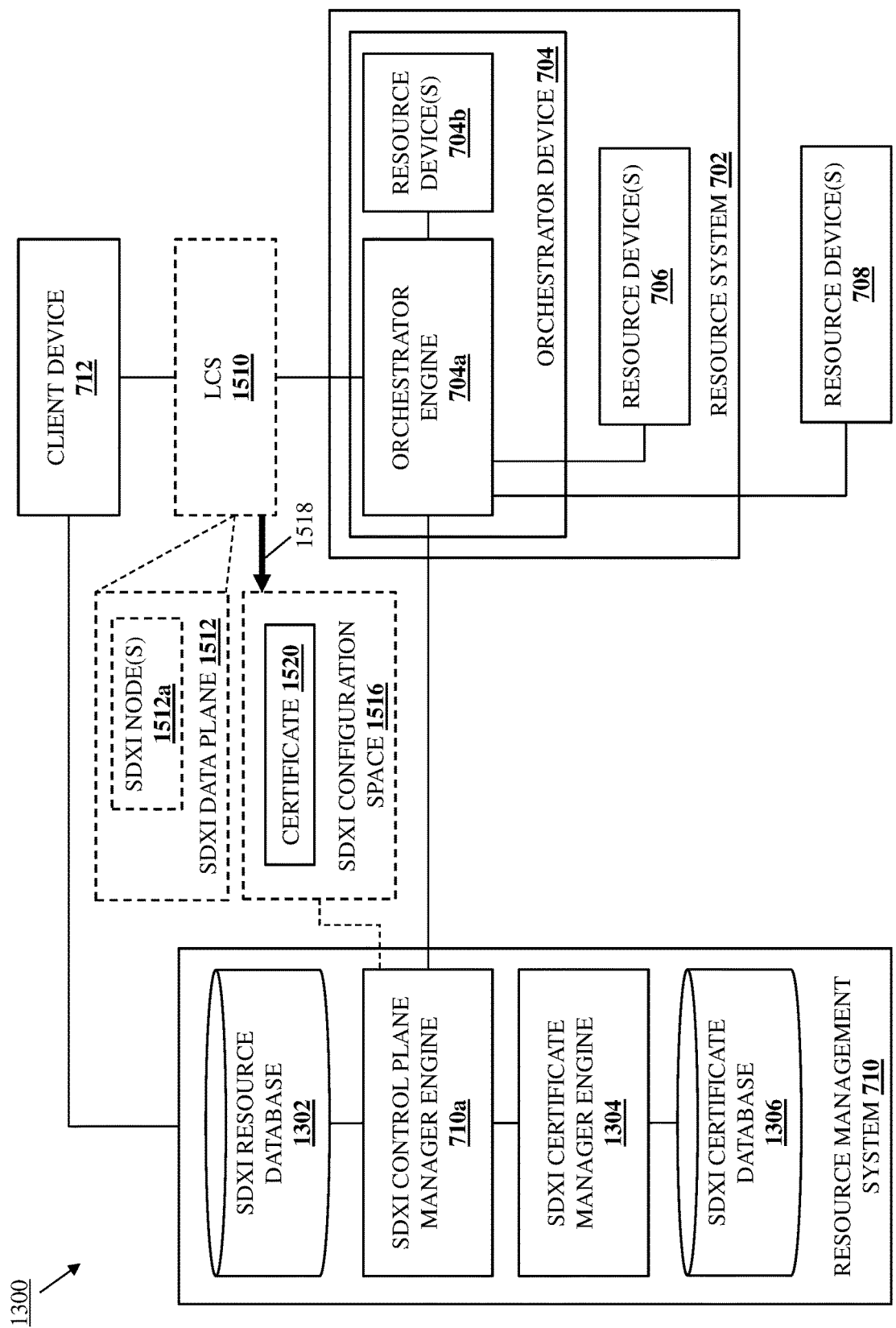
FIG. 15D is a schematic view illustrating an embodiment of the LCS SDXI resource ownership system of FIG. 13 operating during the method of FIG. 14.

The method 1400 then proceeds to block 1406 where the SDXI controller subsystem receives a unique LCS identifier from the LCS via the SDXI configuration space. With reference to FIG. 15D, in an embodiment of block 1406, the LCS 1510 may perform LCS identifier provisioning operations 1516 that may include, for example, generating and providing a certificate 1520 that identifies the LCS 1510 in the SDXI configuration space 1516. In a specific example, the certificate 1520 may be generated and provide by the LCS 1510 as part of the LCS 1520 requesting the use of a particular SDXI node 1512a that provides the SDXI data plane 1512. For example, the LCS 1510 may be configured to generate an identity certificate 1520 (e.g., an X509 certificate using certificate generation techniques known in the art) that is unique to its identity (e.g., unique to the workload it was composed to perform), and may provide that certificate 1520 in the SDXI configuration space 1516 by storing it in the shared memory space on the memory subsystem provided by the resource device(s) 704b as part of SDXI node use request operations that request the use of one or more particular SDXI node(s) 1512a during its operation. In a specific example, the LCS 1510 may store the certificate 1520 in a predefined destination address in the memory subsystem that provides the SDXI configuration space 1516, which as discussed below may be mapped to an SDXI controller resource/LCS linking map utilized by the SDXI controller subsystem.

Figure 15E:
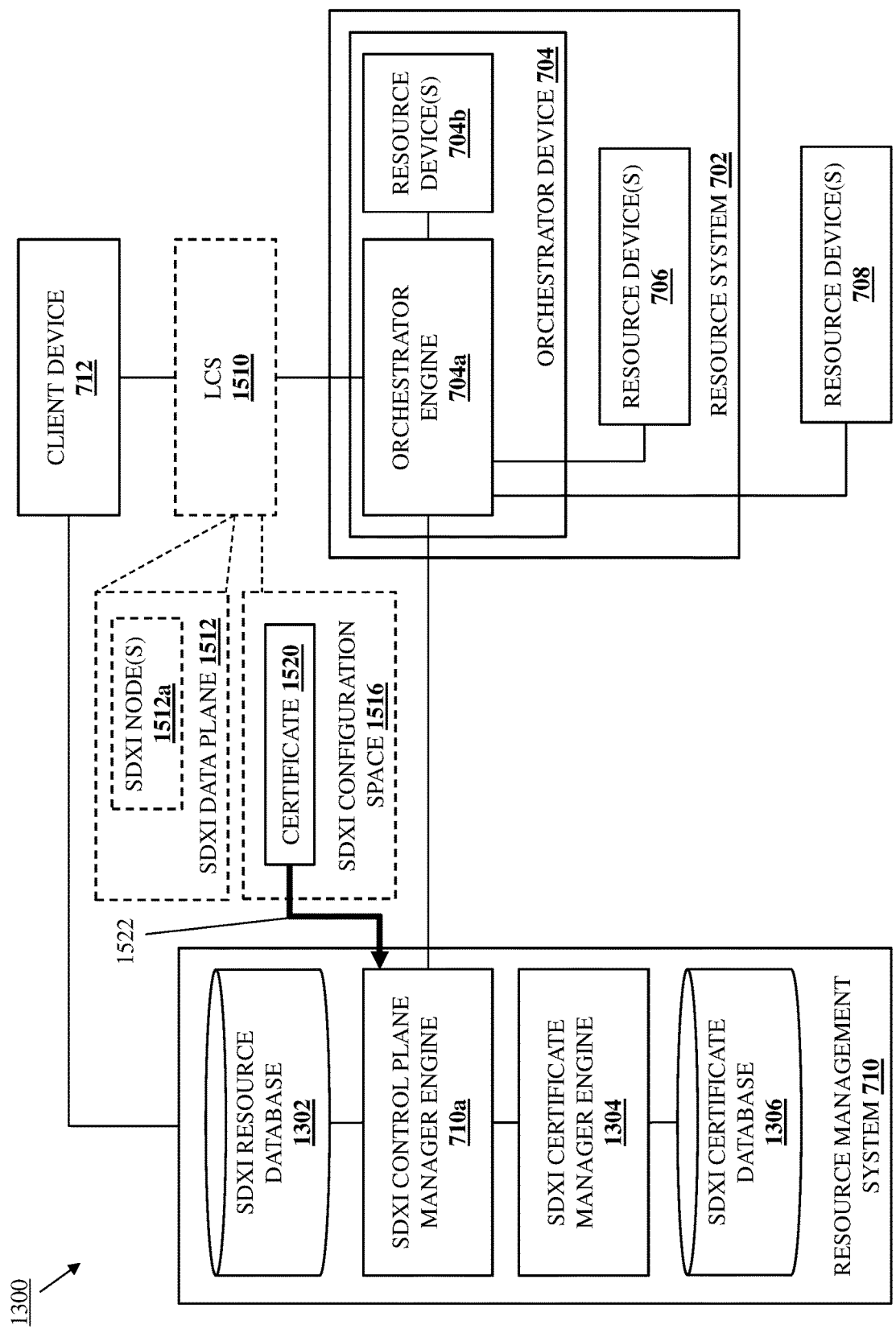
FIG. 15E is a schematic view illustrating an embodiment of the LCS SDXI resource ownership system of FIG. 13 operating during the method of FIG. 14.

With reference to FIG. 15E, in an embodiment of block 1406, the SDXI control plane manager engine 710a in the resource management system 710 may perform LCS identity retrieval operations 1522 that include retrieving the certificate 1520 from the SDXI configuration space 1516 by, for example, retrieving it from the shared memory space on the memory subsystem provided by the resource device(s) 704b. For example, as discussed above, the LCS 1510 may have stored the certificate 1520 in a predefined destination address in the memory subsystem that provides the SDXI configuration space 1516, with that predefined destination address mapped to an SDXI controller resource/LCS linking map utilized by the SDXI controller subsystem. As will be appreciated by one of skill in the art in possession of the present disclosure, the storage of the certificate 1520 in the predefined destination address in the memory subsystem that provides the SDXI configuration space 1516 may cause the SDXI control plane manager engine 710a to retrieve the certificate 1520 from that predefined destination address.

Figure 15F:
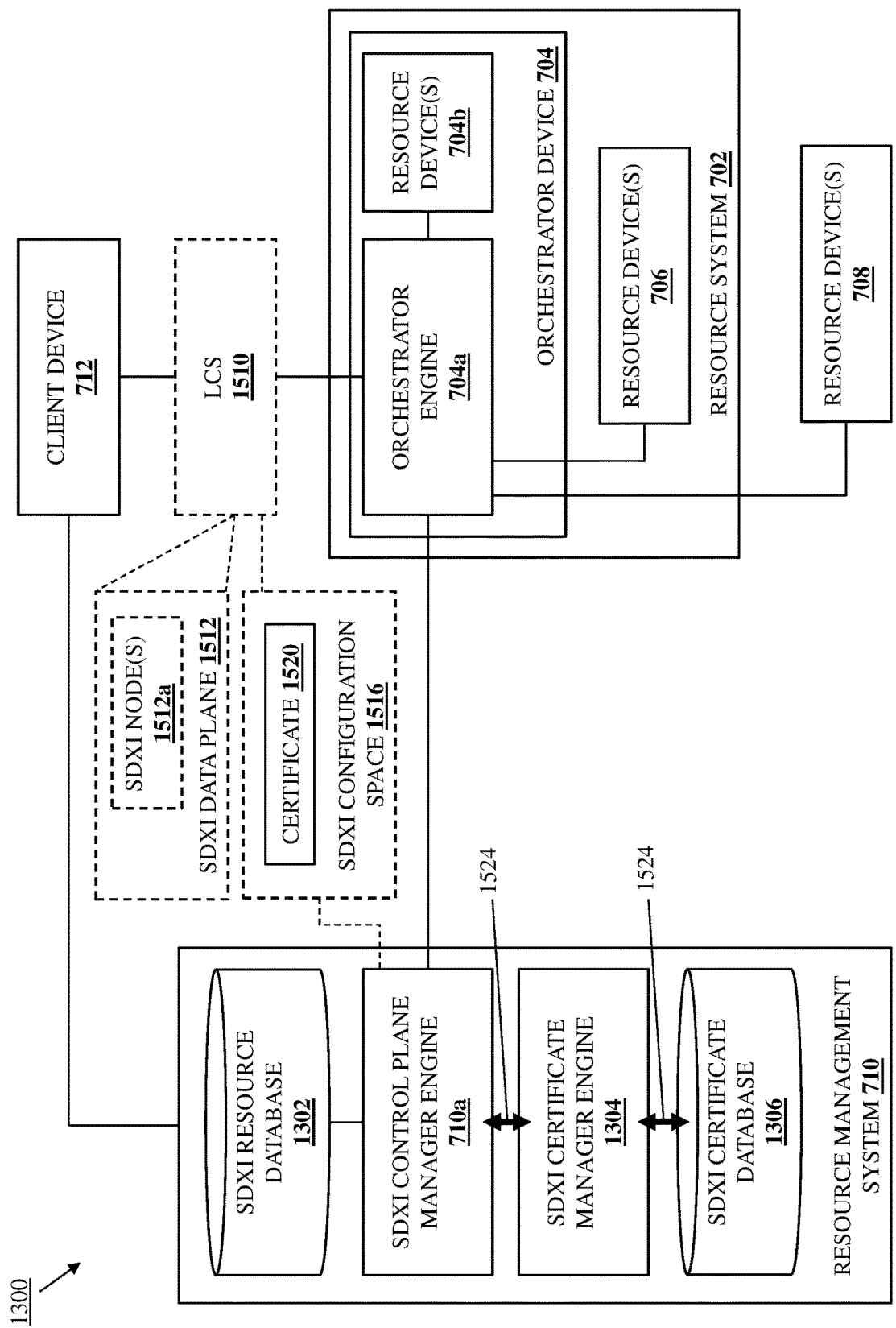
FIG. 15F is a schematic view illustrating an embodiment of the LCS SDXI resource ownership system of FIG. 13 operating during the method of FIG. 14.

With reference to FIG. 15F, in an embodiment of block 1406 and in response to retrieving the certificate 1520, the SDXI control plane manager engine 710a and the SDXI certificate manager engine 1304 may perform LCS identity verification operations 1524 in order to verify the LCS identity identified in the certificate 1520. For example, the LCS identity verification operations 1524 may include the SDXI control plane manager engine 710a providing the certificate 1520 received from the SDXI configuration space 1516 to the SDXI certificate manager engine 1304, the SDXI certificate manager engine 1304 verifying the LCS identity provided in the certificate 1520 using certificate verification information stored in the SDXI certificate verification database 1306, and the SDXI certificate manager engine 1304 communicating back to the SDXI control plane manager engine 710a about whether the LCS identity was verified. Furthermore, while described as verifying an LCS identity provided via a certificate, one of skill in the art in possession of the present disclosure will appreciate how the SDXI certificate manager engine 1304 and SDXI certificate database 1306 may be utilized to generate, update, and/or otherwise manage certificates used to assign SDXI nodes and/or their resources to an LCS while remaining within the scope of the present disclosure as well. However, while a particular certificate-based technique for identifying an LCS has been described, one of skill in the art in possession of the present disclosure will appreciate how LCSs may be identified using other techniques while remaining within the scope of the present disclosure as well.

Figure 15G:
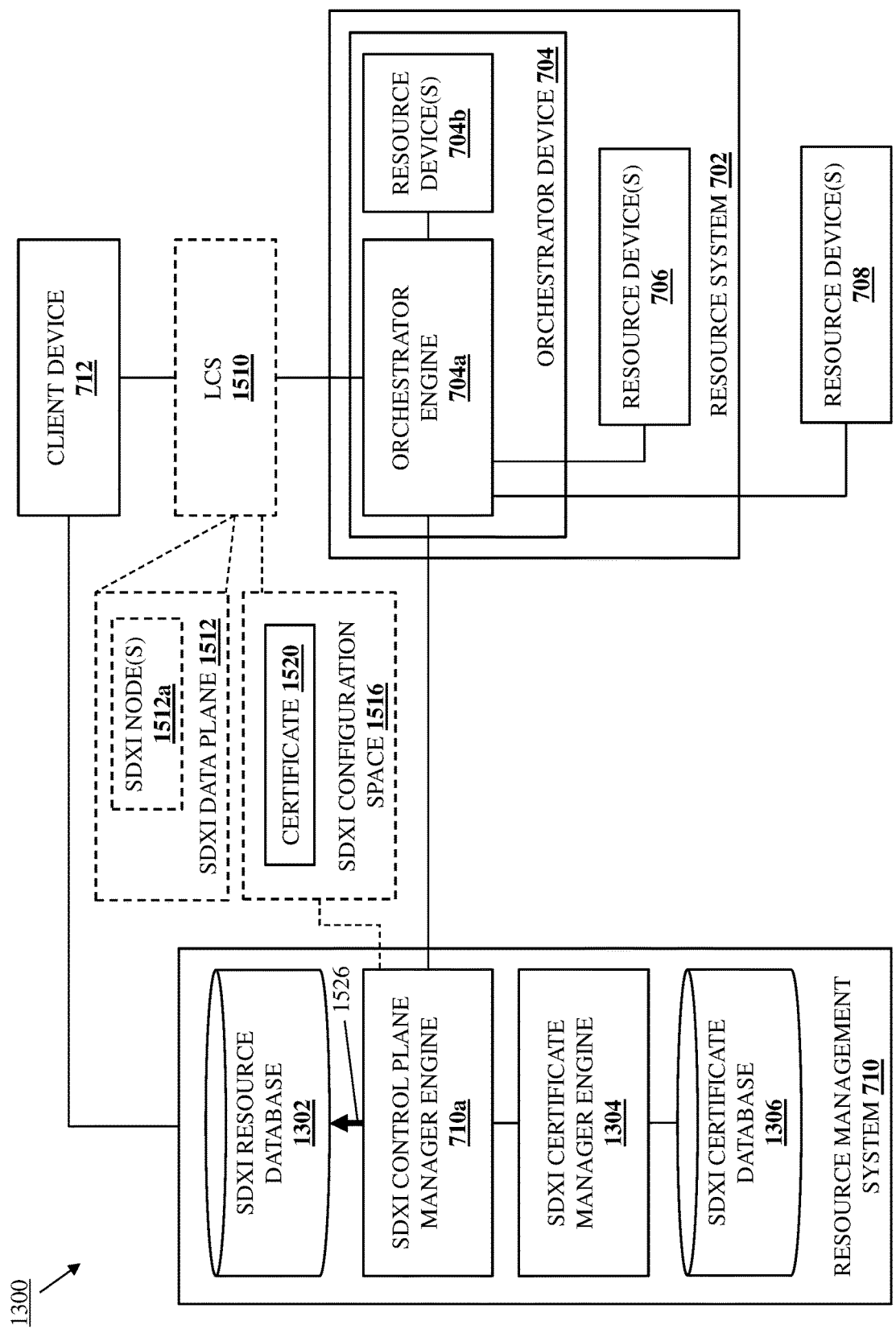
FIG. 15G is a schematic view illustrating an embodiment of the LCS SDXI resource ownership system of FIG. 13 operating during the method of FIG. 14.

The method 1400 then proceeds to block 1408 where the SDXI controller subsystem links the SDXI nodes to the LCS in an SDXI resource database using the unique LCS identifier. With reference to FIG. 15G, in an embodiment of block 1408 and in response to identifying the LCS 1510, the SDXI control plane manager engine 710a may perform LCS/SDXI node linking operations 1526 that include linking the SDXI nodes requested by and/or used to provide the LCS 1510 with the LCS identifier received and verified at block 1406. For example, each of the SDXI nodes requested by and/or used to provide the LCS 1510 may include a Universally Unique IDentifier (UUID), and at block 1408 the SDXI control plane manager engine 710a may link the LCS identifier for the LCS 1510 that was verified at block 1406 with each of the UUIDs for the SDXI nodes requested by and/or providing that LCS 1510 in the SDXI resource database 1302, which as discussed below operates to bind the ownership of those SDXI nodes to the LCS identifier (e.g., the LCS identity defined by the workload it was composed to perform), and ensures that SDXI nodes providing an LCS are immutable to that LCS as long as required/utilized by that LCS and not reassigned to another LCS. However, while specific examples have been provided, one of skill in the art in possession of the present disclosure will appreciate how ownership of SDXI nodes may be assigned to an LCS in other manners that will fall within the scope of the present disclosure as well.

Figure 15H:
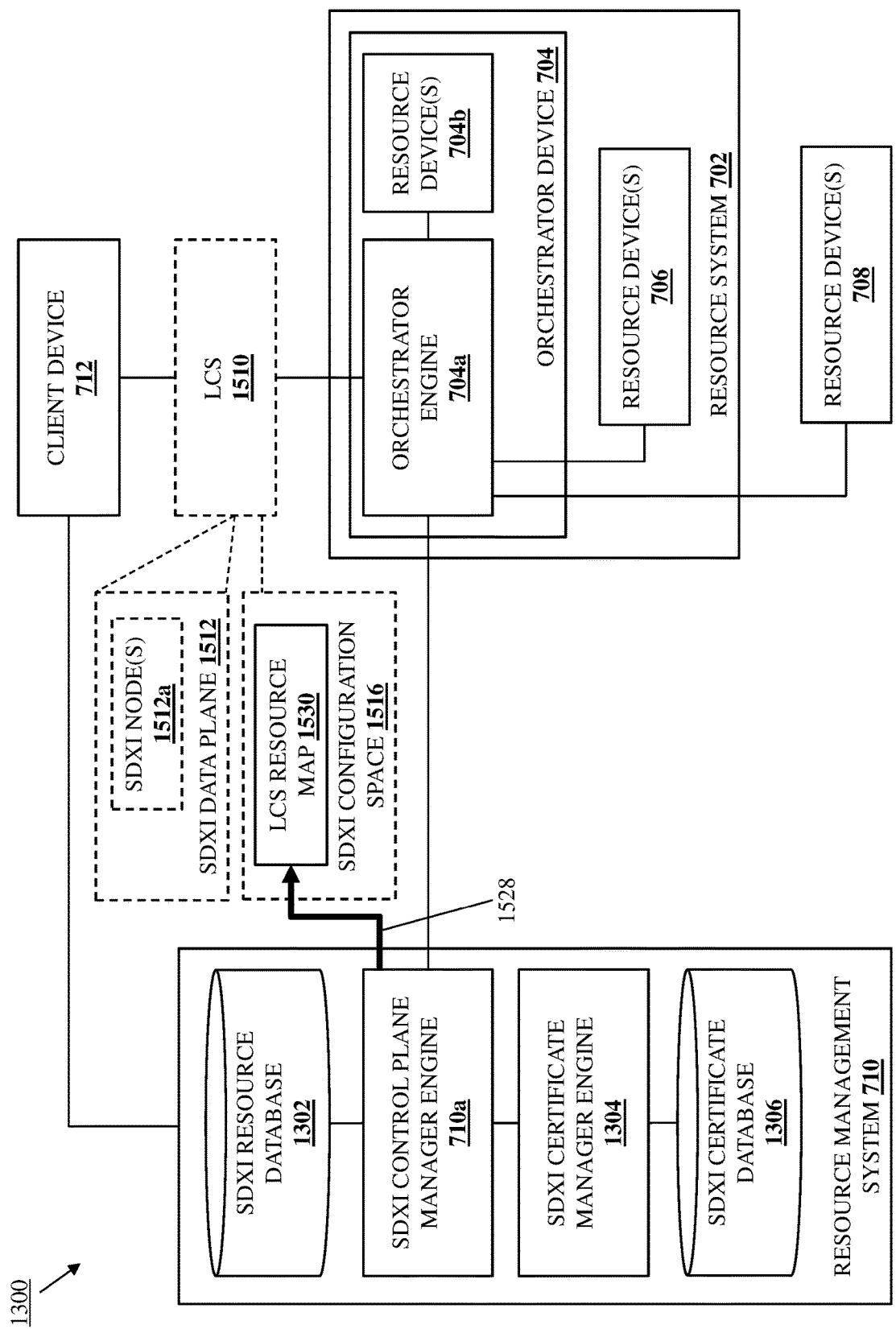
FIG. 15H is a schematic view illustrating an embodiment of the LCS SDXI resource ownership system of FIG. 13 operating during the method of FIG. 14.

The method 1400 then proceeds to block 1410 where the SDXI controller subsystem presents the LCS an LCS resource map via the SDXI configuration space. With reference to FIG. 15H, in an embodiment of block 1410, the SDXI control plane manager engine 710a may perform LCS resource map presentation operations 1528 that include presenting an LCS resource map 1530 to the LCS via the SDXI configuration space 1516 by, for example, providing the LCS resource map 1530 in the memory subsystem included in the resource device(s) 704b that provides the SDXI configuration space 1516. As will be appreciated by one of skill in the art in possession of the present disclosure, the LCS resource map 1530 may identify the SDXI nodes currently "owned" by the LCS 1510 based on SDXI node usage requests from the LCS 1510, and may be utilized by the LCS 1510 in a variety of manners. For example, with reference to FIG. 15I, the LCS 1510 may perform LCS resource map utilization operations 1532 that may direct an SDXI node provisioning request, an SDXI node removal request, an SDXI node transfer request, and/or any of a variety of SDXI node requests that would be apparent to one of skill in the art in possession of the present disclosure, to the LCS resource map 1530.

Figure 15I:
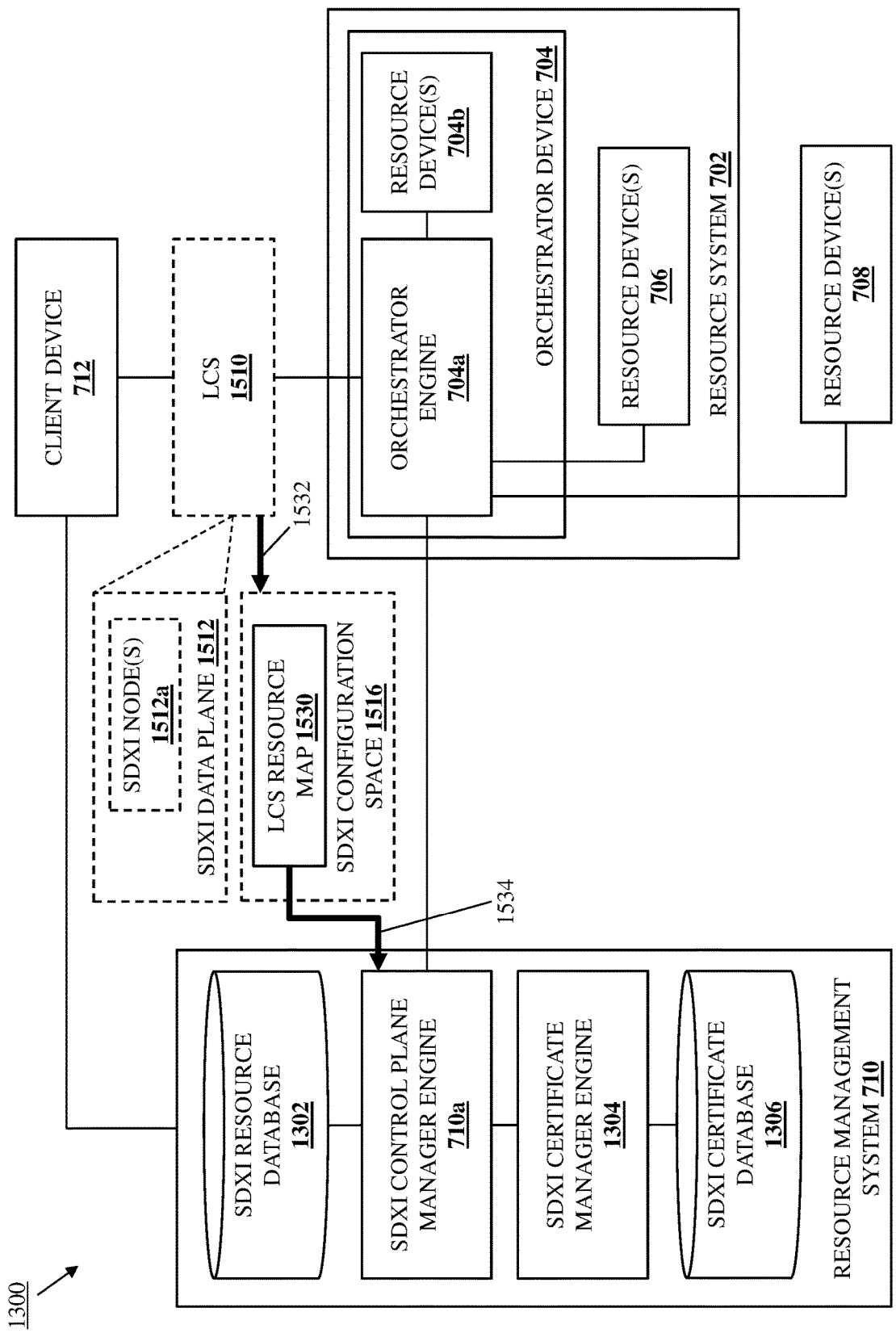
FIG. 15I is a schematic view illustrating an embodiment of the LCS SDXI resource ownership system of FIG. 13 operating during the method of FIG. 14.

As also illustrated in FIG. 15I, in response to the LCS resource map utilization operations 1532 by the LCS 1510, the SDXI control plane manager engine 710*a* in the resource management system 710 may receive the SDXI node request from the LCS 1510 and execute that SDXI node request. For example, the SDXI control plane manager engine 710*a* may receive the SDXI node provisioning request that requests an SDXI node be provisioned to the LCS 1510 and, in response, may operate to identify, configure, and link an SDXI node (e.g. provided by the resource devices 704*b*, 706, and/or 708) to the LCS 1510 similarly as described above. In another example, the SDXI control plane manager engine 710*a* may receive the SDXI node removal request that requests an SDXI node be removed from providing the LCS 1510 and, in response, may operate to unlink an SDXI node (e.g., provided by the resource devices 704*b*, 706, and/or 708) that was linked to the LCS 1510 in the SDXI resource database 1302 as described above.

In another example, the SDXI control plane manager engine 710*a* may receive the SDXI node transfer request that requests an SDXI node be transferred from providing the LCS 1510 to providing another LCS and, in response, may operate to transfer the ownership of an SDXI node that is linked to the LCS 1510 in the SDXI resource database 1302 as described above to another LCS (e.g., another LCS provided by the resource system 702 or another resource system). As will be appreciated by one of skill in the art in possession of the present disclosure, the LCS 1510 may receive an instruction to transfer data to another LCS, and rather than transfer that data from one of its SDXI nodes 1512*a* in the SDXI data plane 1512 to an SDXI node providing another LCS, the LCS 1510 may request that SDXI node be transferred to that other LCS (i.e., to provide the SDXI data plane for that other LCS) so that the other LCS may access the data stored thereon. However, while a few specific examples of the use of the LCS resource map 1530 in the SDXI configuration space 1516 have been described, one of skill in the art in possession of the present disclosure will appreciate how the LCS resource map 1530 may be utilized in a variety of other manners that will fall within the scope of the present disclosure as well.

The method 1400 then proceeds to decision block 1412 where the method 1400 proceeds depending on whether the LCS is migrated. In an embodiment, at block 1412, the method 1400 may proceed depending on whether the LCS 1510 is migrated to another resource system by, for example, providing an operating system for that LCS 1510 using a processing system/memory system combination that is housed in a different resource system. If, at decision block 1412, the LCS is not migrated, the method 1400 returns to block 1410. As such, the method 1400 may loop such that the LCS 1510 is provided to the client device 712 with the LCS resource map 1530 presented to the LCS 1510 substantially as described above as long as the LCS 1510 is not migrated.

Figure 15J:
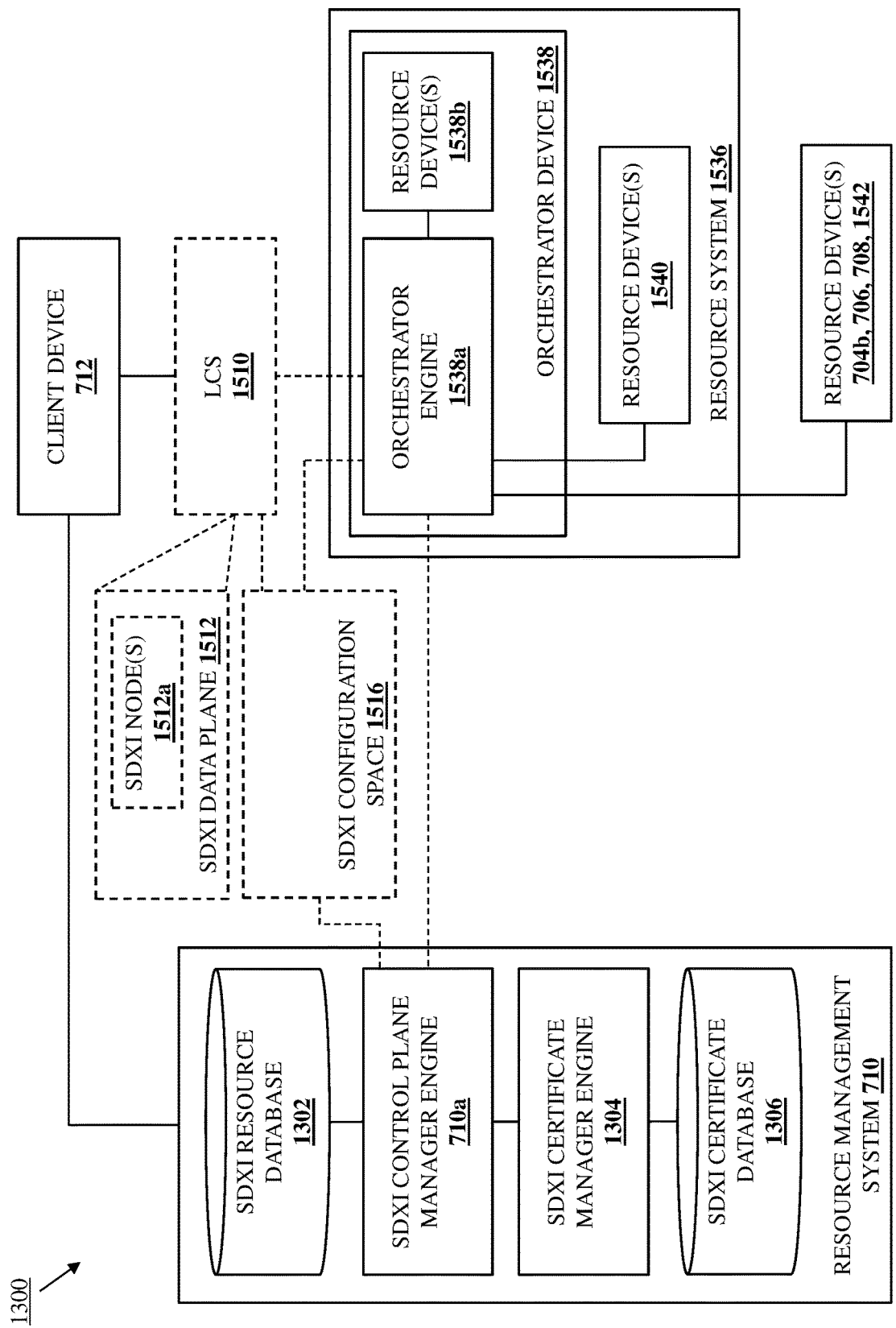
FIG. 15J is a schematic view illustrating an embodiment of the LCS SDXI resource ownership system of FIG. 13 operating during the method of FIG. 14.

If, at decision block 1412, the LCS is migrated, the method 1400 proceeds to block 1414 where the LCS performs operations using the SDXI nodes following migration based on the linking of the LCS to the SDXI nodes. In an embodiment, at block 1412, the LCS 1510 may be migrated to another resource system. For example, FIG. 15J illustrates how the LCS 1510 may be migrated to a resource system 1536 having an orchestrator device 1538 including an orchestrator engine 1538*a* coupled to resource device(s) 1538*b* on the orchestrator device 1538 and resource device(s) 1540 in the resource system 1536, and one of skill in the art in possession of the present disclosure will appreciate how the resource system 1536 may be substantially similar to the resource system 702 described above, the orchestrator device 1538 and orchestrator engine 1538*a* may be substantially similar to the orchestrator device 704 and orchestrator engine 704*a* described above, and the resource devices 1538*b* and 1540 may be substantially similar to the resource devices 704*b* and 706 discussed above. Furthermore, FIG. 15J illustrates how the orchestrator engine 1538*a* may be coupled to the resource devices 704*b*, 706, and 708 discussed above, as well as to resource device(s) 1542 that may be located outside the resource device 1536 and that may be substantially similar to the resource devices 708 described above.

To provide a specific example, the migration of the LCS 1510 to the resource system 1536 may include providing an operating system for the LCS 1510 (which was previously provided by the resource system 702) using a processing system and memory system provided by the resource devices 1540 in the resource system 1536. As illustrated in FIG. 15J, following the migration of the LCS 1510 to the resource system 1536 the LCS 1510 will still include the SDXI data plane 1512 provided by the SDXI node(s) 1512*a* due to the linking of the LCS 1510 and those SDXI node(s) 1512*a* in the SDXI resource database 1302, which allows the LCS 1510 to perform operations using the SDXI node(s) 1512*a* that provide the SDXI data plane 1512. As such, following migration of the LCS 1510 from the resource system 702 to the resource system 1536, the operating system for the LCS 1510 provided using the processing system and memory system provided by the resource devices 1540 in the resource system 1536 may perform operations (e.g., data storage operations, data retrieval operations, etc.) using the memory subsystems in the SDXI nodes 1512*a* that are "owned" or linked to that LCS 1510. As will be appreciated by one of skill in the art in possession of the present disclosure, the linking of SDXI nodes to an LCS may include the storage of any SDXI node configurations for any SDXI node so that an SDXI node configuration provided for an SDXI node prior to LCS migration will persist for that SDXI node subsequent to LCS migration (e.g., if an SDXI node is configured to perform compression/decompression and/or encryption/decryption on data provided for storage (or stored) thereon, that configuration will persist post-LCS-migration) As such, SDXI nodes may be uniquely identifiable and bound to an LCS to allow them to be migrated along with that LCS in an LCS provisioning system.

Thus, systems and methods have been described that provide for the linking of an LCS with the SDXI resources that are used to provide that LCS in order to ensure that those SDXI resources are available for providing that LCS when the LCS is migrated between resource systems. For example, the LCS SDXI resource ownership system of the present disclosure may include a resource system having an orchestrator device coupled to resource devices and a resource management system. An SDXI controller subsystem is provided by the resource management system and/or the orchestrator device, and operates to use the first resource system to provide an LCS with an SDXI data plane provided by an SDXI node included in the resource devices, and create an SDXI configuration space for the LCS. The SDXI controller subsystem then receives a unique LCS identifier from the LCS via the SDXI configuration space, and links the SDXI node to the LCS in an SDXI resource database using the unique LCS identifier. The SDXI controller subsystem then migrates the LCS to a second resource system, and the LCS performs operations using the SDXI node following migration to the second resource system based on the linking of the LCS to the SDXI node. As such, LCSs may be assigned "ownership" of SDXI resources included in a disaggregated and composable architecture that is used to provide LCSs in a manner that provides for the migration of that ownership assignment when an corresponding LCS is migrated between resource systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) Smart Data Accelerator Interface (SDXI) resource ownership system, comprising:
    a plurality of resource devices;
    a resource management system;
    a first resource system that includes an orchestrator device that is coupled to the plurality of resource devices and the resource management system; and
    a Smart Data Accelerator Interface (SDXI) controller subsystem that is provided by at least one of the resource management system and the orchestrator device and that is configured to:
        provide, using the first resource system, a first LCS with an SDXI data plane that is provided by a first SDXI node included in the plurality of resource devices;
        create an SDXI configuration space for the first LCS;
        receive, from the first LCS via the SDXI configuration space, a unique LCS identifier;
        link, in an SDXI resource database using the unique LCS identifier, the first SDXI node to the first LCS; and
        migrate the first LCS to a second resource system, wherein the first LCS performs operations using the first SDXI node following migration to the second resource system based on the linking of the first LCS to the first SDXI node in the SDXI resource database.

2. The system of claim 1, wherein the receiving the unique LCS identifier from the first LCS via the SDXI configuration space includes:
    receiving, from the first LCS at a predetermined address in the SDXI configuration space, an LCS identity certificate;
    validating the LCS identity certificate; and
    linking the SDXI node to the first LCS in response to validating the LCS identity certificate.

3. The system of claim 1, wherein the SDXI controller subsystem is configured to:
    present, to the first LCS via the SDXI configuration space, an LCS resource map that identifies the first SDXI node linked to the first LCS.

4. The system of claim 3, wherein the SDXI controller subsystem is configured to:
    receive, from the first LCS via the SDXI configuration space based on the LCS resource map, a request for a second SDXI node.

5. The system of claim 3, wherein the SDXI controller subsystem is configured to:
    receive, from the first LCS via the SDXI configuration space based on the LCS resource map, a request to link the first SDXI node to a second LCS.

6. The system of claim 1, wherein the linking of the first LCS to the first SDXI node in the SDXI resource database causes a first SDXI node configuration of the first SDXI node to be maintained following the migration of the first LCS to the second resource system.

7. The system of claim 1, wherein the SDXI configuration space is created in a memory system that is included on the orchestrator device.

8. An Information Handling System (IHS), comprising:
    at least one processing system; and
    at least one memory system that is coupled to the at least one processing system and that includes instructions that, when executed by the at least one processing system, cause the at least one processing system to provide a Smart Data Accelerator Interface (SDXI) controller engine that is configured to:
        provide, using a first resource system, a first Logically Composed System (LCS) with an SDXI data plane that is provided by a first SDXI node included in a plurality of resource devices;
        create an SDXI configuration space for the first LCS;
        receive, from the first LCS via the SDXI configuration space, a unique LCS identifier;
        link, in an SDXI resource database using the unique LCS identifier, the first SDXI node to the first LCS; and
        migrate the first LCS to a second resource system, wherein the linking of the first LCS to the first SDXI node in the SDXI resource database allows the first LCS to perform operations using the first SDXI node following migration to the second resource system.

9. The IHS of claim 8, wherein the receiving the unique LCS identifier from the first LCS via the SDXI configuration space includes:
    receiving, from the first LCS at a predetermined address in the SDXI configuration space, an LCS identity certificate;
    validating the LCS identity certificate; and
    linking the SDXI node to the first LCS in response to validating the LCS identity certificate.

10. The IHS of claim 8, wherein the SDXI controller engine is configured to:
    present, to the first LCS via the SDXI configuration space, an LCS resource map that identifies the first SDXI node linked to the first LCS.

11. The IHS of claim 10, wherein the SDXI controller subsystem is configured to:
    receive, from the first LCS via the SDXI configuration space based on the LCS resource map, a request for a second SDXI node.

12. The IHS of claim 10, wherein the SDXI controller subsystem is configured to:
    receive, from the first LCS via the SDXI configuration space based on the LCS resource map, a request to link the first SDXI node to a second LCS.

13. The IHS of claim 8, wherein the linking of the first LCS to the first SDXI node in the SDXI resource database causes a first SDXI node configuration of the first SDXI node to be maintained following the migration of the first LCS to the second resource system.

14. A method for providing ownership of Smart Data Accelerator Interface (SDXI) resources for a Logically Composed System (LCS), comprising:
  providing, by a Smart Data Accelerator Interface (SDXI) controller subsystem using a first resource system, a first Logically Composed System (LCS) with an SDXI data plane that is provided by a first SDXI node included in a plurality of resource devices;
  creating, by the SDXI controller subsystem, an SDXI configuration space for the first LCS;
  receiving, by the SDXI controller subsystem from the first LCS via the SDXI configuration space, a unique LCS identifier;
  linking, by the SDXI controller subsystem in an SDXI resource database using the unique LCS identifier, the first SDXI node to the first LCS; and
  migrating, by the SDXI controller subsystem, the first LCS to a second resource system, wherein the linking of the first LCS to the first SDXI node in the SDXI resource database allows the first LCS to perform operations using the first SDXI node following migration to the second resource system.

15. The method of claim 14, wherein the receiving the unique LCS identifier from the first LCS via the SDXI configuration space includes:
  receiving, by the SDXI controller subsystem from the first LCS at a predetermined address in the SDXI configuration space, an LCS identity certificate;
  validating, by the SDXI controller subsystem, the LCS identity certificate; and
  linking, by the SDXI controller subsystem, the SDXI node to the first LCS in response to validating the LCS identity certificate.

16. The method of claim 14, further comprising:
  presenting, by the SDXI controller subsystem to the first LCS via the SDXI configuration space, an LCS resource map that identifies the first SDXI node linked to the first LCS.

17. The method of claim 16, further comprising:
  receiving, by the SDXI controller subsystem from the first LCS via the SDXI configuration space based on the LCS resource map, a request for a second SDXI node.

18. The method of claim 14, further comprising:
  receiving, by the SDXI controller subsystem from the first LCS via the SDXI configuration space based on the LCS resource map, a request to link the first SDXI node to a second LCS.

19. The method of claim 14, wherein the linking of the first LCS to the first SDXI node in the SDXI resource database causes a first SDXI node configuration of the first SDXI node to be maintained following the migration of the first LCS to the second resource system.

20. The method of claim 19, wherein the SDXI configuration space is created in a memory system that is included on an orchestrator device in the first resource system.

\* \* \* \* \*